United States Patent
Fujii et al.

(10) Patent No.: US 7,392,155 B2
(45) Date of Patent: Jun. 24, 2008

(54) DISTANCE CALCULATION DEVICE AND CALCULATION PROGRAM

(75) Inventors: Asako Fujii, Kawasaki (JP); Tomonobu Takashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/276,346

(22) Filed: Feb. 24, 2006

(65) Prior Publication Data

US 2006/0139619 A1 Jun. 29, 2006

Related U.S. Application Data

(63) Continuation of application No. PCT/JP2003/014029, filed on Oct. 31, 2003.

(51) Int. Cl.
G01B 5/02 (2006.01)
G01P 15/00 (2006.01)
G01C 21/30 (2006.01)

(52) U.S. Cl. .......................... 702/158; 73/490; 701/208

(58) Field of Classification Search ................ 702/158, 702/150, 149, 151; 73/490, 504.03; 701/207, 701/208; 340/988
See application file for complete search history.

(56) References Cited

U.S. PATENT DOCUMENTS

| | | | | |
|---|---|---|---|---|
| 4,435,760 A | * | 3/1984 | Kuno et al. ................ | 701/207 |
| 5,247,466 A | * | 9/1993 | Shimada et al. ............ | 702/141 |
| 5,483,455 A | | 1/1996 | Lay et al. .................. | 701/206 |
| 5,935,191 A | * | 8/1999 | Sakanashi et al. .......... | 701/207 |
| 5,986,583 A | * | 11/1999 | Nakano et al. ............. | 340/988 |
| 6,018,696 A | | 1/2000 | Matsuoka et al. .......... | 701/207 |
| 6,115,668 A | * | 9/2000 | Kaneko et al. ............. | 701/207 |
| 6,253,154 B1 | * | 6/2001 | Oshizawa et al. .......... | 701/221 |
| 6,993,425 B2 | * | 1/2006 | Tange et al. ................ | 701/96 |

FOREIGN PATENT DOCUMENTS

| | | |
|---|---|---|
| JP | 3381312 | 12/2002 |
| WO | 98/23918 | 6/1998 |
| WO | 99/53335 | 10/1999 |

OTHER PUBLICATIONS

Kimoto et al., Map Building With Radar and Motion Sensors for Automated Highway Vehicle Navigation, 1997 IEEE, pp. 1721-1728.*
Ma et al., Simultaneous Detection of Land and Pavement Boundaries Using Model-Based Multisensor Fusion, Sep. 2000, IEEE Transactions on Intelligent Transportation Systems, vol. 1, No. 3, pp. 135-147.*
Rogers, R., Improved Heading Using Dual Speed Sensors for Angular Rate and Odometry in Land Navigation, 1998 IEEE, pp. 177-184.*
Kato et al., An Obstacle Detection Method by Fusion of Radar and Motion Stereo, Sep. 2002, IEEE Transactions on Intelligent Transportation Systems, vol. 3, No. 3, pp. 182-188.*
International Search Report for PCT/JP/03/14029, mailed Feb. 3, 2004.

* cited by examiner

Primary Examiner—Michael P. Nghiem
Assistant Examiner—Toan M. Le
(74) Attorney, Agent, or Firm—Staas & Halsey LLP

(57) ABSTRACT

It is intended to accurately calculate the distance between a movable body and a subject on the basis of various quantities of state, such as the azimuth angle between the movable body and the subject, velocity, and yaw rate. A calculation device includes a unit for calculating the azimuth angle between movable body and a subject, a unit for calculating the distance traveled by the movable body between two points of time, a unit for calculating a change in angle in the direction of movement, and a unit for calculating the linear distance from the movable body to the subject by using the unit.

15 Claims, 28 Drawing Sheets

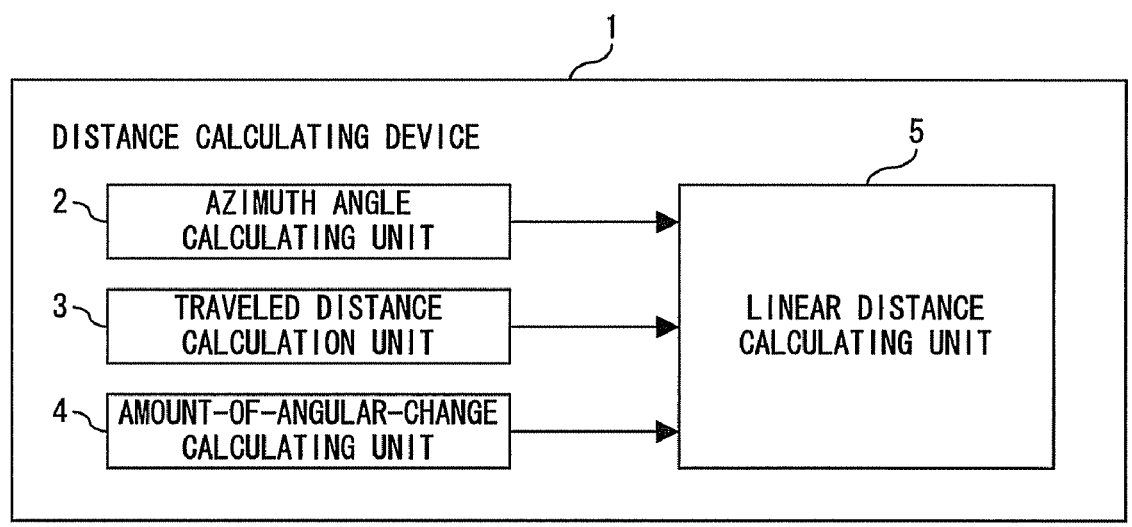
F I G. 1

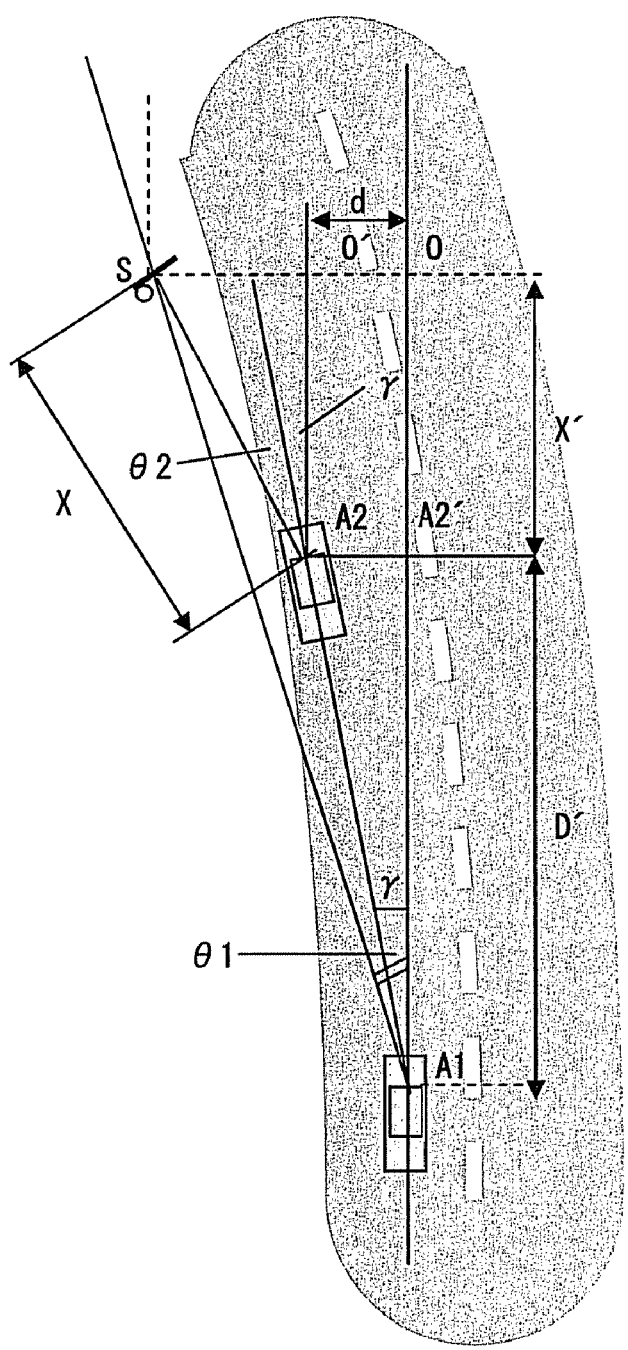
F I G. 6

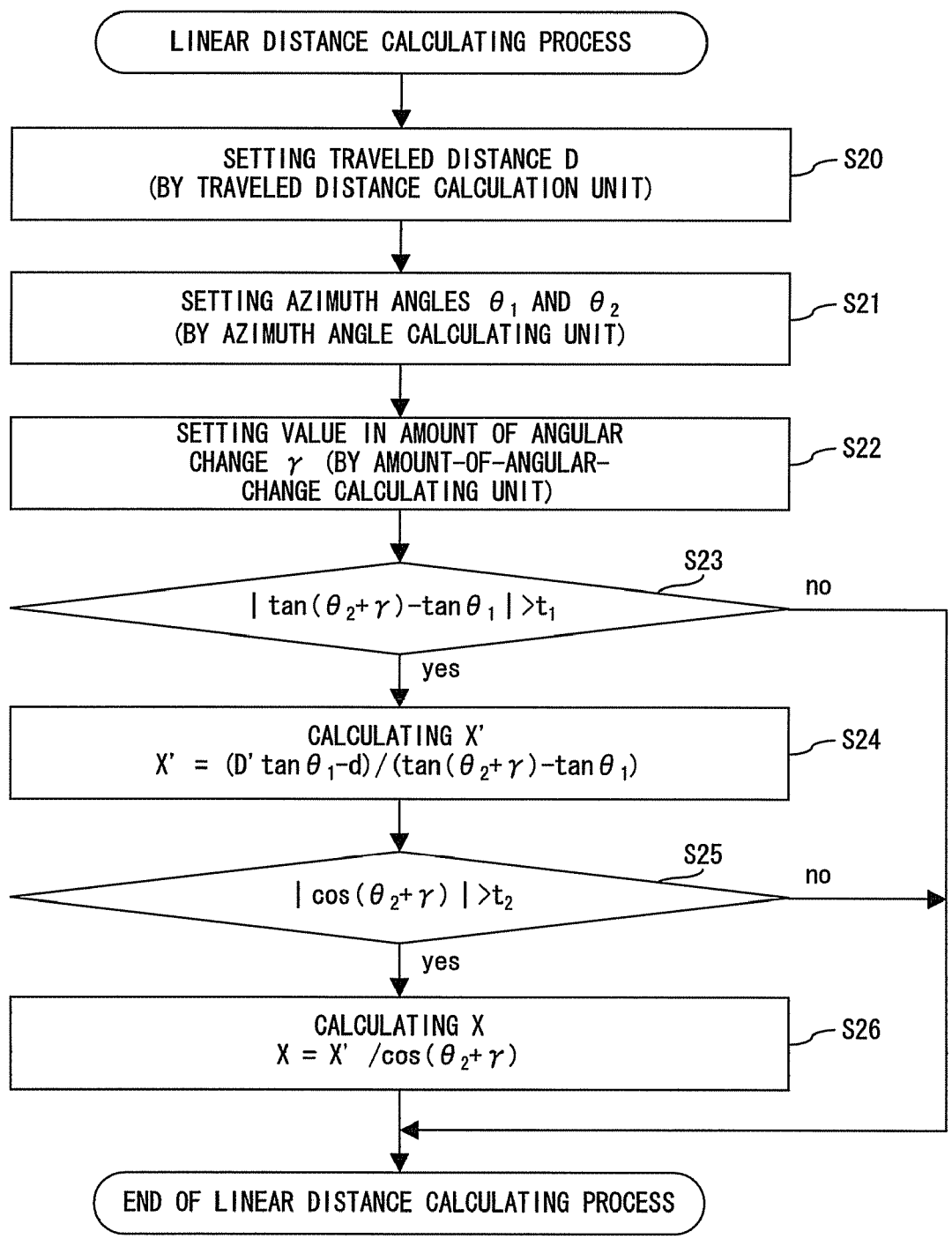
F I G. 7

DISTANCE CALCULATION DEVICE AND CALCULATION PROGRAM

CROSS REFERENCE TO RELATED APPLICATION

This application is a continuation of PCT application PCT/JP2003/014029, which was filed on Oct. 31, 2003.

BACKGROUND OF THE INVENTION

1. Field of the Invention

The present invention relates to a distance calculation system between a movable body and a fixed subject, and more specifically to, for example, a distance calculation device and a calculation program for calculating the correct distance between a traveling vehicle on a road and a subject based on the amount of status of a vehicle such as the elevation angle between a traveling vehicle and a subject, an azimuth angle, the velocity and the yaw rate of a vehicle, etc.

2. Description of the Related Art

The car navigation technology of guiding a driver depending on the current position of a vehicle and the destination has made much progress and has become widespread by detecting the position of a vehicle using a map database and a GPS (global positioning system). In this system, based on the information about the latitude and the longitude obtained by the GPS, the position of the pertinent vehicle is superposed and displayed on the map, and the distance to a crossing, etc. is calculated.

An example of the above-mentioned conventional technology is disclosed by the following patent document.

Patent Document

Japanese Patent No. 3381312 (P3381312) "Navigation Apparatus"

This patent document discloses the technology of recognizing a subject whose position can be designated according to map information, calculating the distance between the subject and the pertinent vehicle based on the running distance of the vehicle between two points of time, and the elevation angle from each point to the same subject, and correcting the position of the pertinent vehicle.

However, in this conventional technology, only the linear distance to a traffic signal can be calculated, and there is the problem that an error occurs when the distance is calculated on the practical traveled distance on the road which is often a curved road and there is no traffic signal in the traveling direction of the pertinent vehicle.

SUMMARY OF THE INVENTION

The present invention has been developed to solve the above-mentioned problems, and aims at providing a distance calculation device having the high-precision distance measuring capability by appropriate using an azimuth angle, the velocity, and the acceleration (pitching angle), a yaw rate, etc. including the elevation angle from the vehicle for a subject, and a calculation program for the device.

A distance calculating device according to an embodiment of the present invention includes at least an azimuth angle calculating unit, a traveled distance calculation unit, an amount-of-angular-change calculating unit, and a linear distance calculating unit.

The azimuth angle calculating unit calculates the angle made by the direction along a movable body, for example, a traveling vehicle, and a fixed subject, for example, a traffic signal, and a traveling direction of the movable body on a horizontal plane as an azimuth angle. The traveled distance calculation unit calculates the traveled distance of a movable body between two points of time, for example, the process interval of 100 ms calculated as a linear distance.

The amount-of-angular-change calculating unit calculates the rotation angle round the vertical axis passing through the centroid of the movable body between the two points of time as the amount of angular change in the traveling direction. The linear distance calculating unit calculates the linear distance between the movable body and the subject using the output of the azimuth angle calculating unit, the traveled distance calculation unit, and the amount-of-angular-change calculating unit.

According to an embodiment of the present invention, the distance calculating device can further include: a current position sensor for detecting the current position of a movable body: database unit for outputting map information containing roads around the current position depending on the output of the current position sensor; and running distance calculation unit for calculating the running distance from the current position to the subject using the output of the database unit, the azimuth angle calculating unit, and the linear distance calculating unit.

According to an embodiment of the present invention, the device can further include subject recognition unit for recognizing a subject from an image including the subject, and as a result, for example, providing the coordinates of the subject for the azimuth angle calculating unit. In this case, the device can further include: subject recognition monitor unit for monitoring whether or not the output of the subject recognition unit has deviate a predetermined range; and subject recognition amendment unit for amending the output of the subject recognition unit, and providing the result for azimuth angle calculating unit when the deviation is detected.

Otherwise, the device can further includes: a velocity sensor for providing the velocity of a movable body for the traveled distance calculation unit; the above-mentioned current position sensor and database unit; roll angle calculation unit for calculating the rotation angle about the traveling direction of a movable body as an angle of roll using the output of the database unit and the velocity sensor; and roll angle amendment unit for amending the recognition result of a subject, for example, coordinates, using the angle of roll and the recognition result of the subject, and providing the result for the azimuth angle calculating unit.

Additionally, in the embodiment, the device can further include: a yaw rate sensor for detecting the rotation angular velocity on the vertical axis of a movable body and providing the result for the amount-of-angular-change calculating unit; and distance estimation unit for estimating a distance from the movable body to the subject using the output of the yaw rate sensor and the linear distance calculating unit, and can further include: yaw rate monitor unit for monitoring the output of the yaw rate sensor and/or the range of output as predetermined range of change, and/or whether or not the change in output has deviated from the predetermined range; and yaw rate amendment unit for amending the output of the yaw rate sensor using the past yaw rate and the value of the velocity, and providing an amendment result for the linear distance calculating unit.

The distance calculation device according to an embodiment of the present invention includes at least elevation angle calculation unit, traveled distance calculation unit, pitching angle calculation unit, and traveling direction distance calculation unit.

The elevation angle calculation unit calculates as an elevation angle the angle made by the direction along a movable body and a subject and a horizontal plane. The pitching angle calculation unit calculates as a pitching angle the rotation angle of the movable body on the horizontal plane depending on the traveling direction of the movable body and the vertical direction. The traveled distance calculation unit calculates the traveled distance between two points of time of the movable body as in the above-mentioned embodiment. The traveling direction distance calculation unit calculates the component in the traveling direction (of a vehicle) as a linear distance from the movable body to the subject using the output of the elevation angle calculation unit, the traveled distance calculation unit, and the pitching angle calculation unit.

In an embodiment of the present invention, as in the above-mentioned embodiment, the device can also include the current position sensor, the database unit, and the traveled distance calculation unit.

An embodiment of the present invention can also include subject recognition unit for recognizing a subject from an image containing the subject, and providing the recognition result for the elevation angle calculation unit. The device can further include the above-mentioned subject recognition monitor unit and subject recognition amendment unit.

In this case, the device can further include the above-mentioned velocity sensor, current position sensor, database unit, roll angle calculation unit, and roll angle amendment unit. The roll angle amendment unit amends the recognition result of the subject and provides the amendment result for the elevation angle calculation unit.

Furthermore, in the embodiment of the present invention, the device further includes an acceleration sensor for detecting the acceleration in the traveling direction of a movable body, and the pitching angle calculation unit can calculate the pitching angle using the output of the acceleration sensor.

Otherwise, the device can further include, in addition to the above-mentioned current position sensor and database unit, inclination angle calculation unit for calculating the inclination angle in the traveling direction around the current position of the movable body using the output of the database unit, and the pitching angle calculation unit can calculate the pitching angle using the output of the inclination angle calculation unit. Furthermore, the device can also an include acceleration sensor, and the pitching angle calculation unit can calculate the pitching angle using the output of the acceleration sensor in addition to the output of the inclination angle calculation unit.

As described above, according to the present invention, the linear distance to a subject, the distance in the traveling direction of a movable body, etc. can be calculated using the azimuth angle of a movable body, the change in angle in the traveling direction of a movable body, etc., and also using the elevation angle of a movable body, the pitching angle of a movable body, etc.

BRIEF DESCRIPTION OF THE DRAWINGS

FIG. 1 is a block diagram of the configuration showing the principle of the distance calculation device according to the present invention;

FIG. 6 is an explanatory view of the linear distance calculating method;

FIG. 7 is a detailed flowchart of the linear distance calculating process;

DESCRIPTION OF THE PREFERRED EMBODIMENTS

Figure 2:
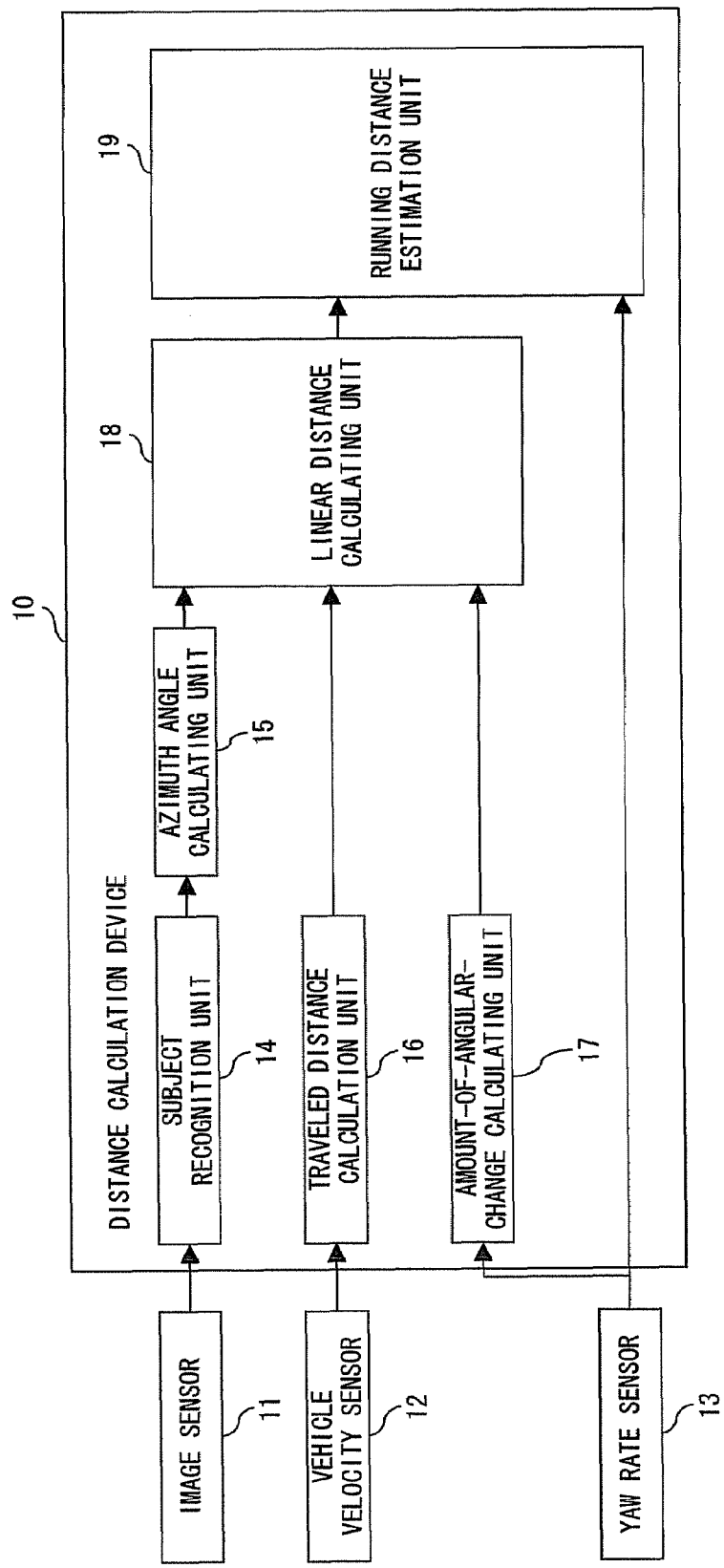
FIG. 2 is a block diagram of the configuration showing the embodiment 1 of the distance calculation device according to the present invention.

The embodiments of the present invention are explained below in detail.

FIG. 1 is a block diagram showing the principle of the distance calculation device according to the present invention. FIG. 1 is a block diagram of the configuration showing the principle of the embodiment 1 of the distance calculation device described later. A distance calculating device 1 according to the embodiment 1 includes at least an azimuth angle calculating unit 2, a traveled distance calculation unit 3, an amount-of-angular-change calculating unit 4, and a linear distance calculating unit 5.

The azimuth angle calculating unit 2 calculates the angle made by the direction along a movable body, for example, a traveling vehicle, and a fixed subject, for example, a traffic signal, and a traveling direction of the movable body on a horizontal plane as an azimuth angle. The traveled distance calculation unit 3 calculates the traveled distance of a movable body between two points of time, for example, the process interval of 100 ms calculated as a linear distance.

The amount-of-angular-change calculating unit 4 calculates the rotation angle round the vertical axis passing through the centroid of the movable body between the two points of time as the amount of angular change in the traveling direction. The linear distance calculating unit 5 calculates the linear distance between the movable body and the subject using the output of the azimuth angle calculating unit 2, the traveled distance calculation unit 3, and the amount-of-angular-change calculating unit 4.

In the present invention, a fixed subject for which the linear distance is calculated from a movable body, for example, a traveling vehicle, can be a traffic signal, a road sign, and other signboard, crossing, crossover, crosswalk, stop line, etc. whose image can be captured by a camera in the traveling vehicle. To calculate the distance, data is fetched by an image sensor, a yaw rate sensor, a vehicle velocity sensor, an acceleration sensor, etc. for each 100 ms, various processes of recognizing a subject, calculating an azimuth angle, etc. are performed for each 100 ms, and finally the linear distance to, for example, a subject, is calculated for each 100 ms. In the following explanation, an embodiment is explained using a traffic signal as a practical example of a subject.

FIG. 2 is a block diagram of the configuration showing the embodiment 1 of the distance calculation device according to the present invention. In FIG. 2, the output of an image sensor 11, a vehicle velocity sensor 12, and a yaw rate sensor 13 is provided for a distance calculation device 10. The image sensor 11 can be, for example, a CCD camera, a CMOS camera, etc. The camera is mounted at a front portion of a vehicle to shoot the traveling direction, and its optical axis is basically set to match the traveling direction of the vehicle. The vehicle velocity sensor 12 detects the velocity of the vehicle wheels, and comprises, for example, four sensors mounted on the four wheels. The yaw rate sensor 13 passes through the centroid, and detects the rotation angular velocity of the vehicle on the axis in the vertical direction.

A subject recognition unit 14 in the distance calculation device 10 realizes a subject, for example, the coordinates of the subject using an image captured by the image sensor 11. As described above, a traffic signal is used as a subject, and the method of recognizing a traffic signal is described later by referring to FIG. 4. An azimuth angle calculating unit 15 calculates the azimuth angle of the subject, for example, a traffic signal, recognized by the subject recognition unit 14. That is, an angle made by the projection line of the line connecting the centroid of a vehicle to the recognized subject and the traveling direction of the vehicle on the horizontal plane passing the centroid of the vehicle is calculated as an azimuth angle.

A traveled distance calculation unit 16 calculates the traveled distance of a vehicle per 100 ms using the output of the vehicle velocity sensor 12. An amount-of-angular-change calculating unit 17 calculates the rotation angle of a vehicle on the rotation axis in the vertical direction in the process interval of 100 ms as an amount of angular change using the output of the yaw rate sensor 13. When the angular velocity of the yaw rate sensor 13 is $\omega$ (rad/s), the amount of angular change is 0.1 $\omega$ (rad).

A linear distance calculating unit 18 calculates the linear distance between a vehicle and a subject using the output of the azimuth angle calculating unit 15, the traveled distance calculation unit 16, and the amount-of-angular-change calculating unit 17. The calculating method is described later by referring to FIGS. 6 and 7. A running distance estimation unit 19 estimates the running distance from the current position of a vehicle to the point of a subject using the output of the linear distance calculating unit 18 and the yaw rate sensor 13. The calculating method is described later by referring to FIG. 8.

Figure 3:
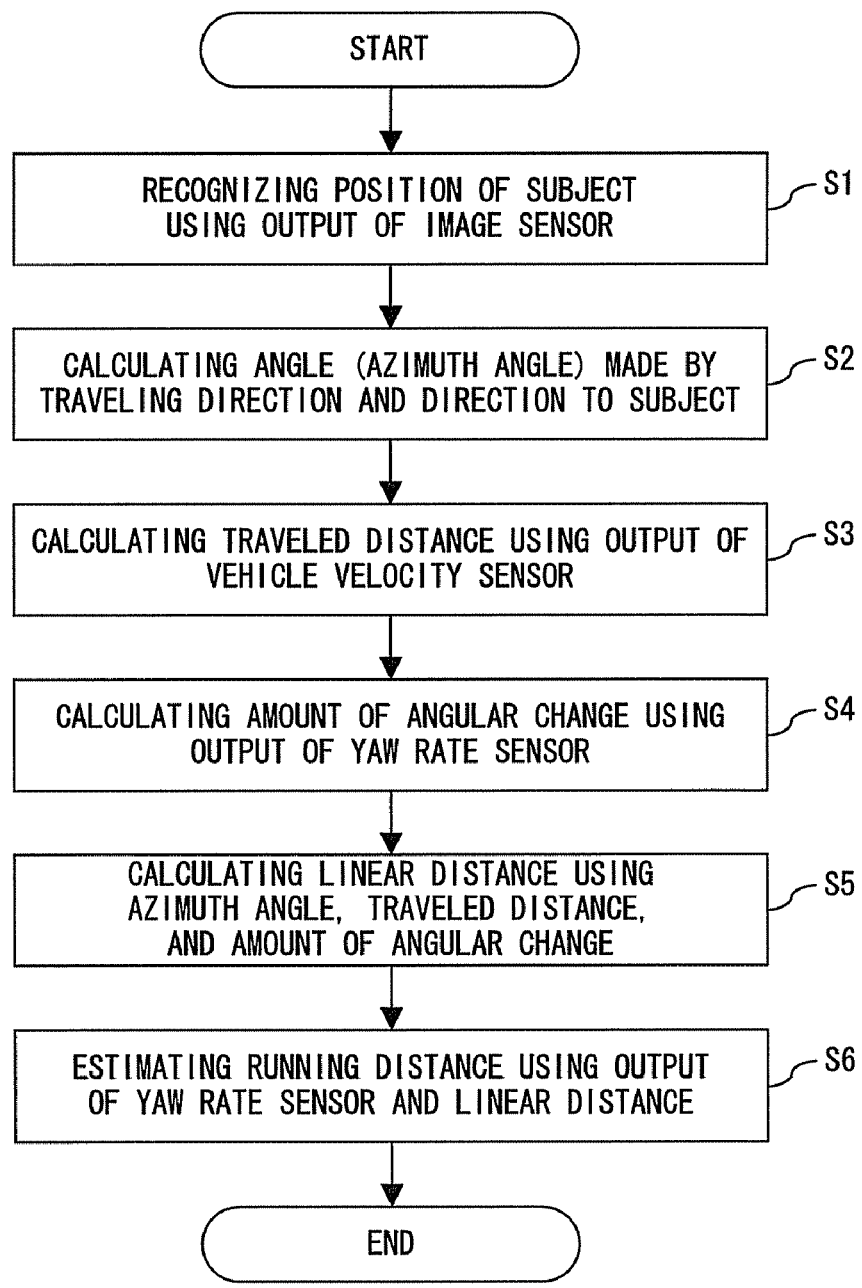
FIG. 3 is a flowchart of the entire process of calculating the distance according to the embodiment 1 of the present invention.

FIG. 3 is a flowchart of the entire process of calculating the distance according to the embodiment 1 of the present invention. When the process is started as shown in FIG. 3, the position of a subject is recognized using the output of the image sensor 11, for example, the coordinates of the red or blue signal of a traffic signal in the image are output in step S1, the angle made by the traveling direction of a vehicle and the direction of the subject, that is, the azimuth angle, is calculated in step S2, the traveled distance of the vehicle between two points of time, that is, the traveled distance in the process interval of 100 ms, is calculated using the output of the vehicle velocity sensor 12 in step S3, and the amount of angular change on the vertical axis of the vehicle is calculated using the output of the yaw rate sensor 13 in step S4.

The processes in steps S1 to S4 can be independently performed, and the order of the processes can be changed, or the processes can be performed in parallel. Then, in step S5, the linear distance to the subject is calculated using the calculated azimuth angle, traveled distance, and amount of angular change, and the running distance is estimated using the result of calculating the linear distance and the output of the yaw rate sensor 13 in step S6, thereby terminating the process.

Figure 4:
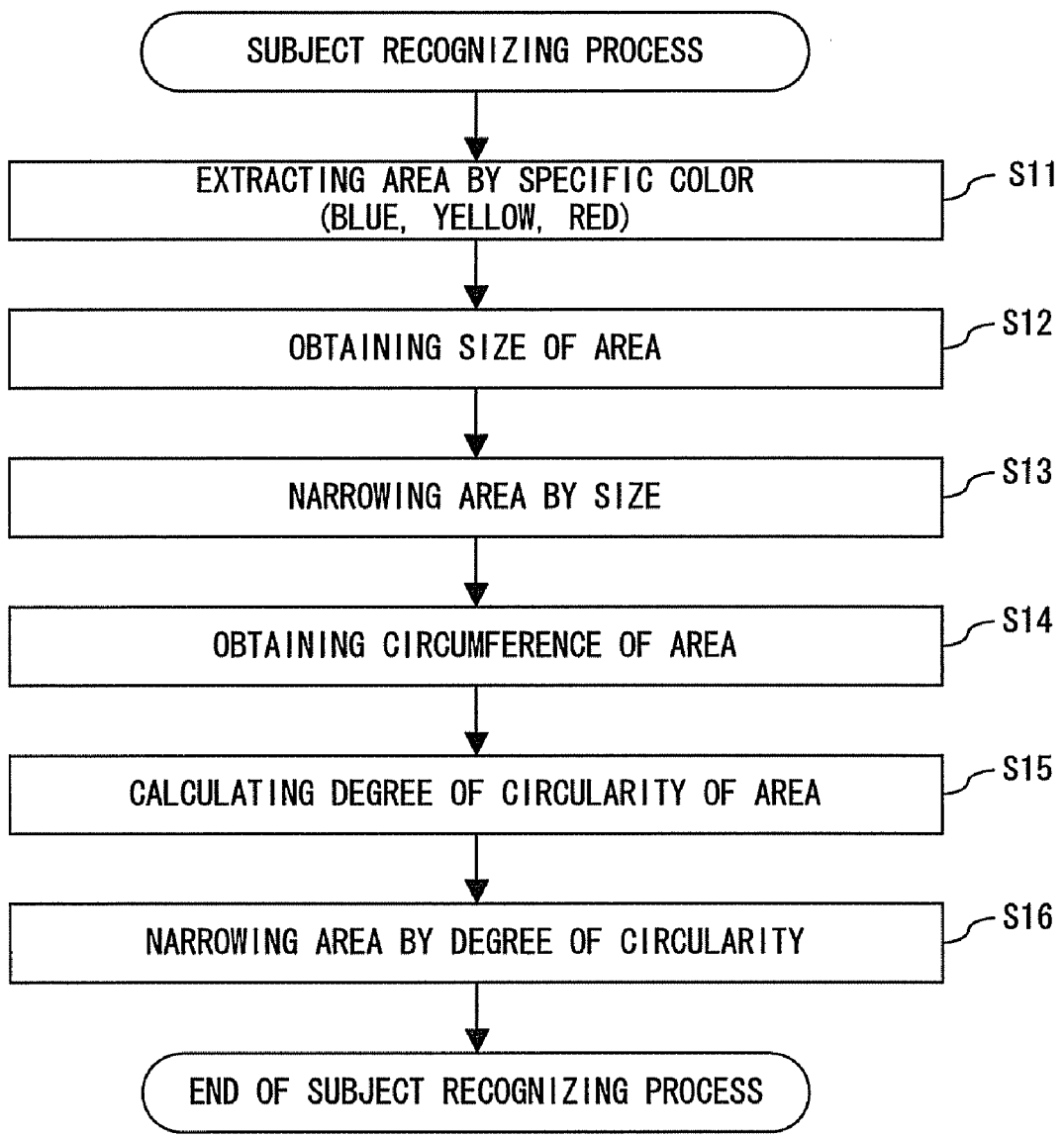
FIG. 4 is a detailed flowchart of the subject recognizing process.

FIG. 4 is a detailed flowchart of the subject recognizing process by the subject recognition unit 14 shown in FIG. 2. When the process is started as shown in FIG. 2, the area of a specific color, that is, blue, yellow, or read which is the color of a traffic signal in this example, is detected. The area of the lighted color of a traffic signal is extracted. However, since it is not certain which color is lighted, the areas of the three colors are detected in this case. It can be considered that a plurality of areas are detected for each of the three colors, or that no areas can be detected.

The size of the area extracted in step S12, that is, the sizes of all areas extracted for the three colors are acquired, and based on the distance to the traffic signal in step S13, the areas are narrowed depending on the size of a range predetermined for correct recognition.

In step S14, the circumference of each area, that is, each of all extracted areas in step 13, is acquired in this example, and the degree of circularity of each area is calculated using the circumference 1 and the area S in step S15. The degree of circularity is calculated by $4\pi S/1^2$, and the area is narrowed by the value of the degree of circularity in step S16, that is, only when the value of the degree of circularity is larger than a predetermined threshold, for example, 0.8, the area is recognized as an area of the signal light of the traffic signal. As a process result, the coordinates of the center of the area of the signal light of the traffic signal in the image are output. The degree of circularity is 1 for a perfect circle. However, in this embodiment, the coordinates of the center of the area whose degree of circularity is larger than the threshold in all extracted areas are output in step S13. It is considered that plural sets of coordinates can be output. In this case, an azimuth angle, etc. is calculated for each set of the output coordinates.

Figure 5:
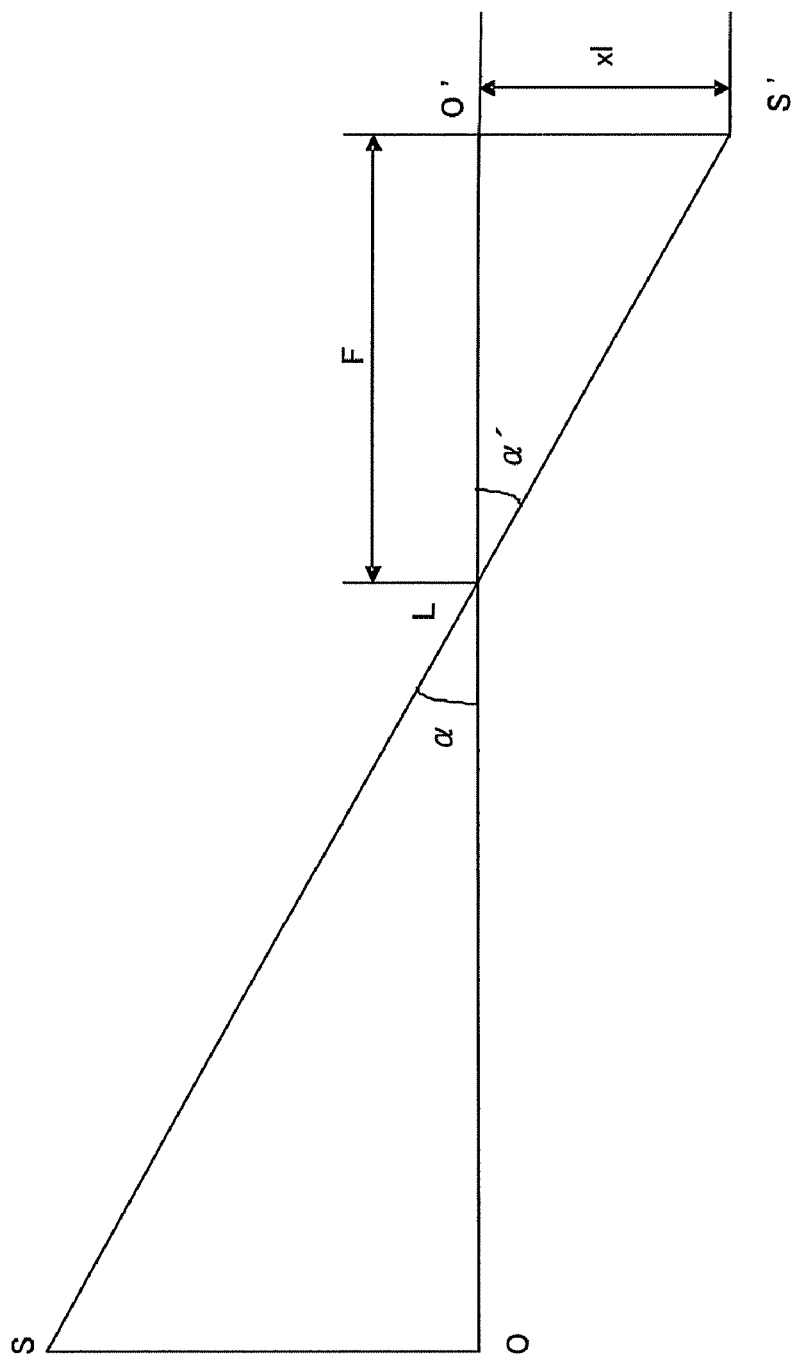
FIG. 5 is an explanatory view of the azimuth angle calculating method.

FIG. 5 is an explanatory view of the azimuth angle calculating method by the azimuth angle calculating unit 15. FIG. 5 is also used in calculating an elevation angle described later, but an elevation angle is calculated using the x coordinate in an image, that is, the x coordinate in the direction perpendicular to the traveling direction of a vehicle on the horizontal plane that passes the position L of the lens of the camera.

In FIG. 5, when the position of the traffic signal on the horizontal plane is defined as S, a line perpendicular to the plane in the optical axis direction of the lens is drawn to the plane and the intersection point on the plane is defined as O, the focal length of the lens is defined as F, the position on the capture surface is defined as O', the x coordinate of the traffic signal (signal light) in the image is defined as x (pixel unit), and the value of the pixel in the x direction is defined as 1. Then, an azimuth angle α to be obtained is equal to α', and the azimuth angle is calculated by $\tan^{-1}(x1/F)$ FIG. 6 is an explanatory view of the method of calculating the distance X by the linear distance calculating unit 18 from the vehicle to the subject S. As shown in FIG. 6, assume that the position of the traffic signal is S, and the vehicle has moved from the point A1 to the point A2 in the time Δt. Also assume that the azimuth angle of the traffic signal from the point A1 is $\theta_1$, and the azimuth angle of the traffic signal from the point A2 is $\theta_2$. A line is drawn from the point A2 perpendicularly to the traveling direction of the vehicle at the point A1, and the intersection point is A2'. When the distance between A1 and A2' is D', and the distance between A2 and A2' is d, D' and d are approximated as follows based on the traveled distance D calculated by the traveled distance calculation unit 16 and the amount of angular change γ calculated by the amount-of-angular-change calculating unit 17.

D'=D cos γ d=D sin γ

A line is drawn perpendicularly to the traveling direction from S when the vehicle is located at A1, and the intersection point is O. When the distance from the point A2' to O is X', the following equation holds.

$d + X' \tan(\theta_2 + \gamma) = (X' + D') \tan \theta_1$

The value X' is obtained as follows.

$X' = (D' \tan\theta_1 - d)/(\tan(\theta_2+\gamma) - \tan\theta_1) = (D \cos\gamma \tan\theta_1 - D\sin\gamma)/(\tan(\theta_2+\gamma) - \tan\theta_1)$ The distance X from A2 to S is calculated by the following equation.

$X = X'/\cos(\theta_2 + \gamma)$

FIG. 7 is a detailed flowchart of the process of calculating the linear distance from the vehicle to the subject by the linear distance calculating unit 18. When the process is started as shown in FIG. 7, the traveled distance calculation unit 16 sets the traveled distance D in step S20, the azimuth angle calculating unit 15 sets the azimuth angle $\theta_1$ and $\theta_2$ in step S21, the amount-of-angular-change calculating unit 17 sets the value of γ in step S22, and it is determined whether or not the absolute value of the denominator of the equation for X' is larger than a threshold $t_1$ in step S23. If the denominator is 0, the value of X' cannot be obtained. When the denominator is close to 0, X' cannot be correctly obtained. Therefore, in such cases, the process immediately terminates.

When it is larger than the threshold $t_1$, the value of X' is calculated in step S24, it is determined in step S25 whether or not the denominator of the equation for X is larger than a threshold $t_2$. If it is not, the process immediately terminates. If it is, the value of X is calculated in step S26, thereby terminating the process.

If the absolute value of the denominator of X' is threshold $t_1$ or less in step S23, and the value of X' cannot be calculated, the current position of the vehicle is estimated using the past distance between the car and the subject, the subsequent vehicle velocity, the yaw rate, etc., thereby calculating the linear distance to the subject. If the distance from the point A1 to the traffic signal S is X" in FIG. 6, X' can be provided also by the following equation, and the X' above can be replaced with the value, thereby calculating the value of X.

$X' = X'' \cos\theta_1 - D'$

When the denominator of X is threshold $t_2$ or less in step S25 shown in FIG. 7, the value of X cannot be calculated. However, when the velocity is extremely low and the traveled distance is not very long, the value of D is subtracted from the value of X", and the value of X can be approximated.

Figure 8:
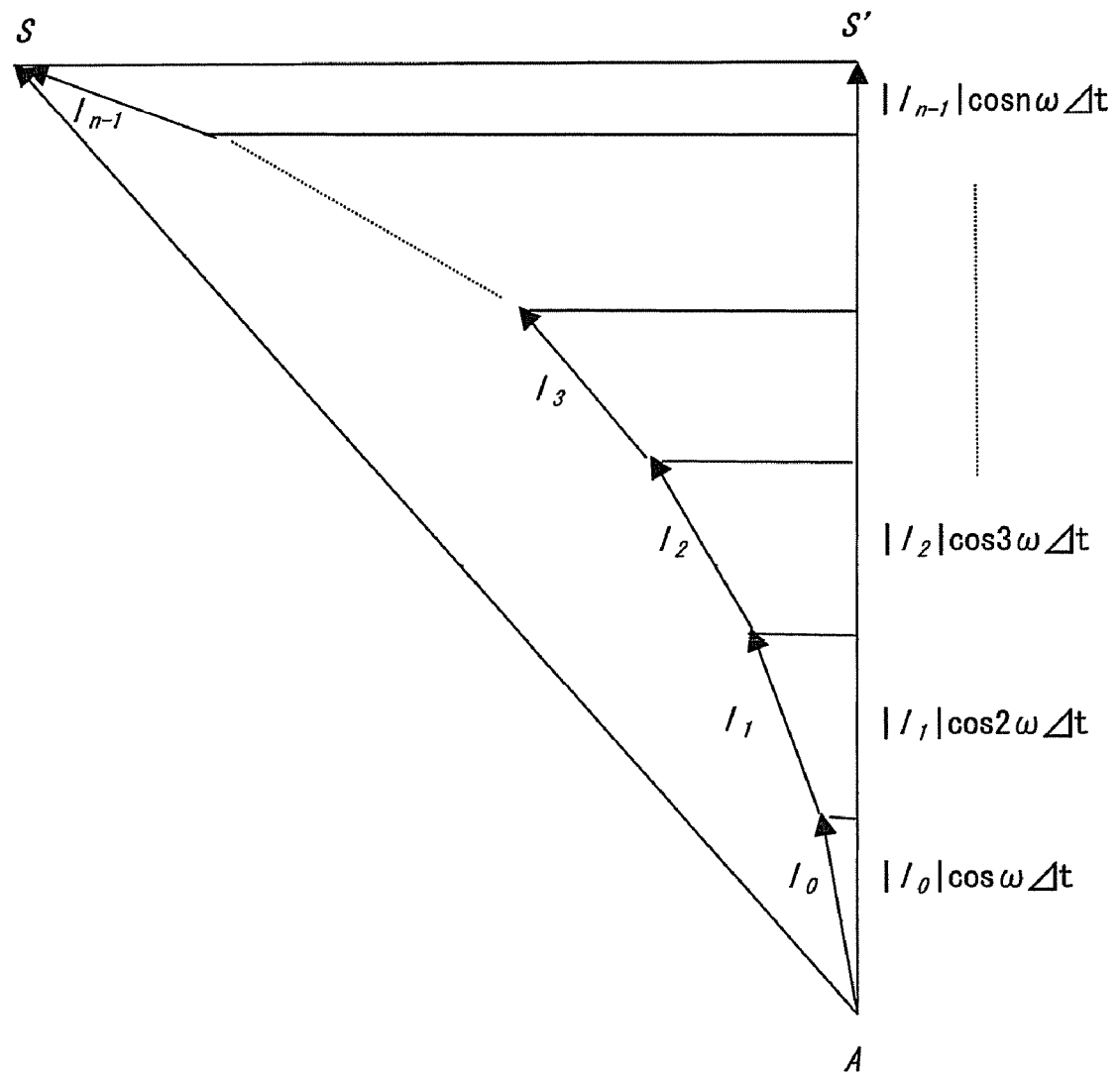
FIG. 8 is an explanatory view of a running distance estimating method.

FIG. 8 is an explanatory view of the method of estimating the running distance by the running distance estimation unit 19 from the current position to the subject. The running distance estimation unit 19 estimates the distance from the current position of the vehicle to the subject along the lane based on the past yaw rate and the velocity of the vehicle. In the estimation, the value of the yaw rate as a rotation angular velocity on the vertical axis passing the centroid of the vehicle is constant on the lane from the current position A to the position S of the subject, the absolute value of the velocity of the vehicle is also constant, the vectors $1_0, 1_1, 1_2, \ldots$ are estimated as shown in FIG. 8 every infinitesimal time Δt, and the arithmetic operation is repeated until the sum of the vectors reaches the position S of the subject, thereby obtaining the sum of the lengths of the vectors and estimating the running distance to the subject.

In FIG. 8, when the line is drawn from the position of the subject perpendicularly to the line from the current position A of the vehicle in the current traveling direction and the intersection point is defined as S', the angle made by the first vector $1_0$ and the direction of S' equals the product of the angular velocity ω and the infinitesimal time Δt. The angle made by the next vector $1_1$ and the direction of S' equals the product of 2 ω and the infinitesimal time Δt. Similarly, the direction of each vector is obtained, and the length of each vector is calculated as the product of the current vehicle velocity v and the infinitesimal time Δt, thereby determining the length of each vector and its direction, and estimating the running distance until the position S of the subject is reached.

Figure 9:
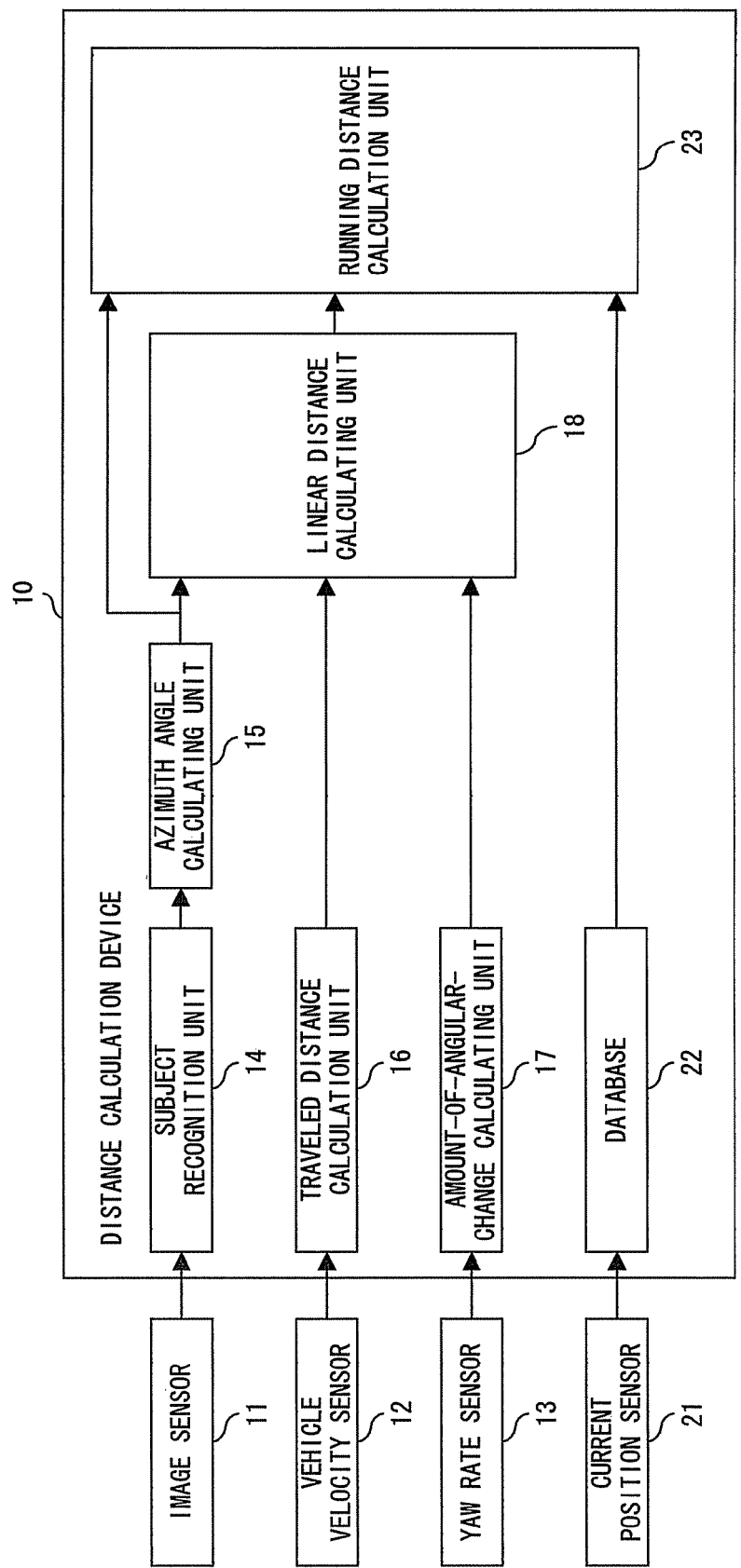
FIG. 9 is a block diagram of the configuration showing the embodiment 2 of the distance calculation device according to the present invention.

Explained below is the embodiment 2 according to the present invention. FIG. 9 is a block diagram is a block diagram of the configuration according to the embodiment 2 of the distance calculation device. As compared with the embodiment 1, the running distance estimation unit 19 is replaced with a running distance calculation unit 23, and in addition to the output of the azimuth angle calculating unit 15 and the output of the linear distance calculating unit 18, the output of a database 22 using the output of a current position sensor 21 outside the distance calculation device 10 is provided for the running distance calculation unit 23.

The current position sensor 21 detects the current position of the vehicle, and can be, for example, a GPS (global positioning system) commonly used for a car navigation system. It is possible to obtain the absolute position such as the latitude, the longitude, the height above the sea level, etc. of the current position of the vehicle using the GPS. However, since the position generally includes some error, it is necessary to refer to the position with the error taken into account.

The database 22 is map information indicating the form (height above the sea level, radius of curvature) of a road, the positions of subjects such as a traffic signal, a crossover, a crossing, etc., and it is possible to designate the position of a vehicle on the map using the position of the pertinent vehicle detected by the current position sensor 21. The database 22 provides the data of the subject near the pertinent, the data of the form of a road, etc. for the running distance calculation unit 23.

The running distance calculation unit 23 determines as the position of the pertinent vehicle the point where the angle made by the direction to the subject and the traveling direction of the pertinent vehicle is equal to the azimuth angle calculated by the azimuth angle calculating unit 15 using the distance between the subject and the pertinent vehicle calculated by the linear distance calculating unit 18 based on the position of the subject obtained according to the map information from the database 22, and calculates the distance from the position to the subject on the road according to the map information. The calculating method is explained by referring to FIGS. 10 and 11.

Figure 10:
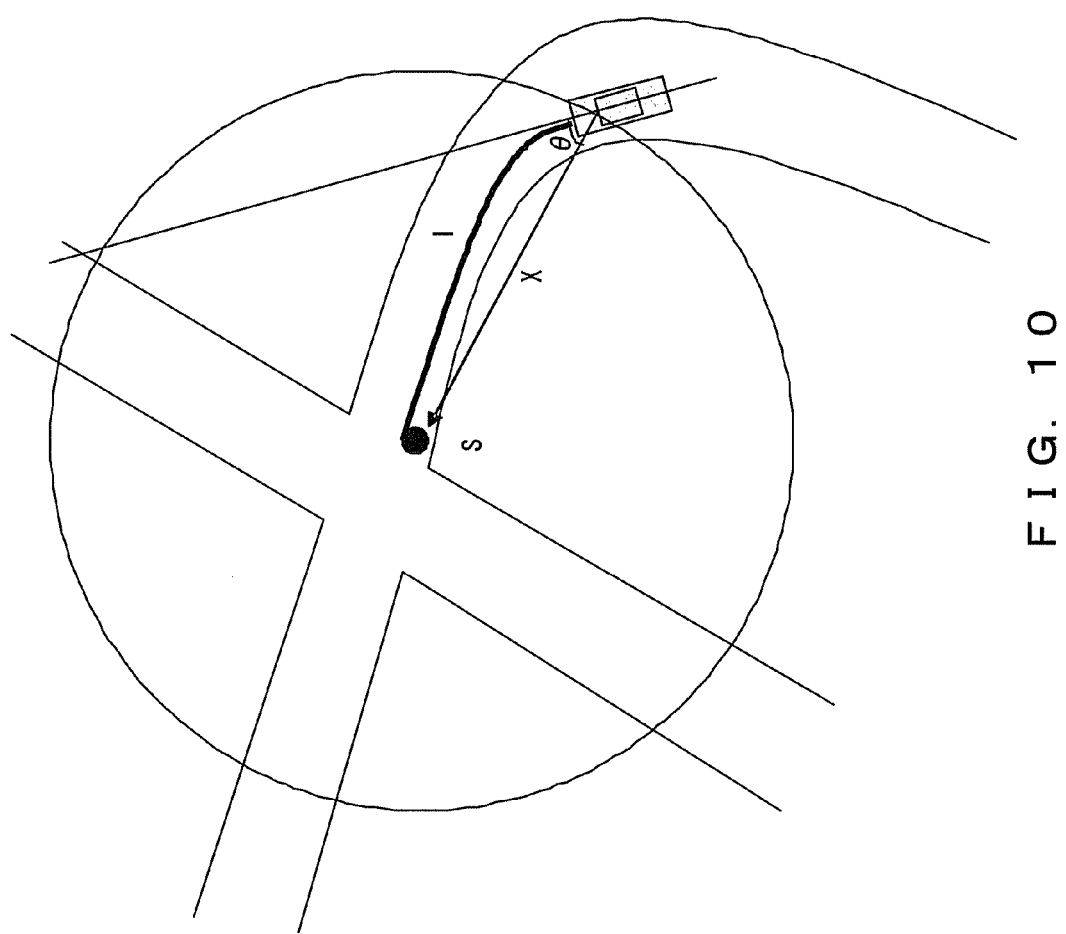
FIG. 10 is an explanatory view of a running distance calculating method.
Figure 11:
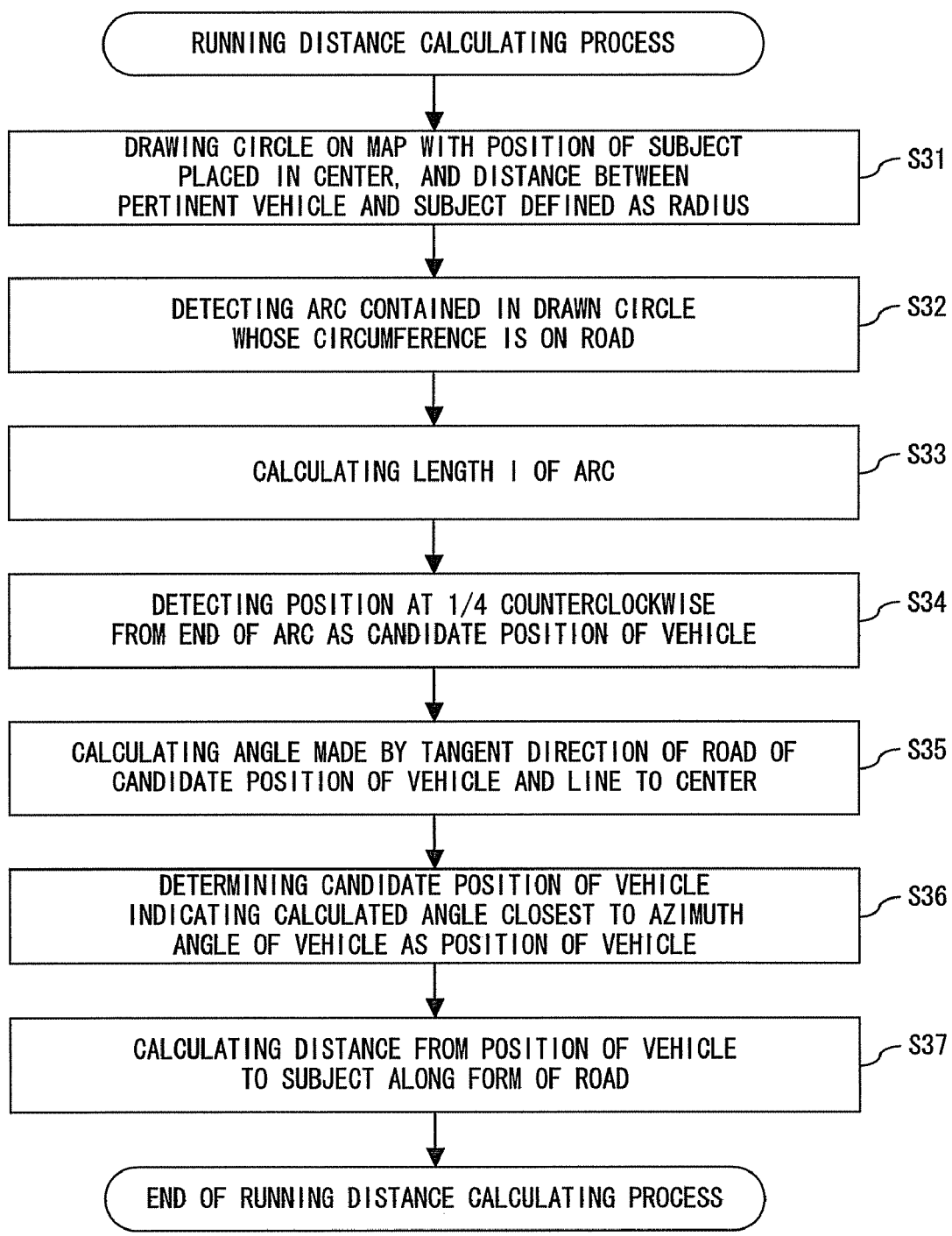
FIG. 11 is a detailed flowchart of the running distance calculating process.

FIG. 11 is a flowchart of the running distance calculating process. First, a circle having a radius which equals the linear distance between the pertinent vehicle and the subject is drawn on a map with the position of the subject S placed in the center as shown in FIG. 10 in step S31, the arcs of the circle that cross the road, that is, four arcs shown in FIG. 10, are detected in step S32, and the length 1 of each arc is calculated in step S33.

Then, in step S34, when the end of each arc, that is, the point moving counterclockwise on the circumference shown in FIG. 10, is considered, the position of the length of ¼ of each arc from the position of the point first reaching each arc is detected as a candidate position of the vehicle. That is, in this example, the road is formed by one up-lane and one down-lane, and the central position of the left lane is detected as a candidate position of the vehicle.

Then, in step S35, the angle made by the line indicating the traveling direction of the vehicle at the candidate position of the vehicle, that is, the line parallel to the tangent direction of the road, and the line connecting the candidate position of the vehicle is calculated for each arc, the candidate position of the vehicle closest to the value of the azimuth angle calculated by the azimuth angle calculating unit 15 is determined as the current position of the vehicle in the calculated values of the angles, that is, in the four values shown in FIG. 10 in step S36, the distance from the current position of the vehicle to the subject is calculated based on the form of the road in step S37, thereby terminating the process.

Figure 12:
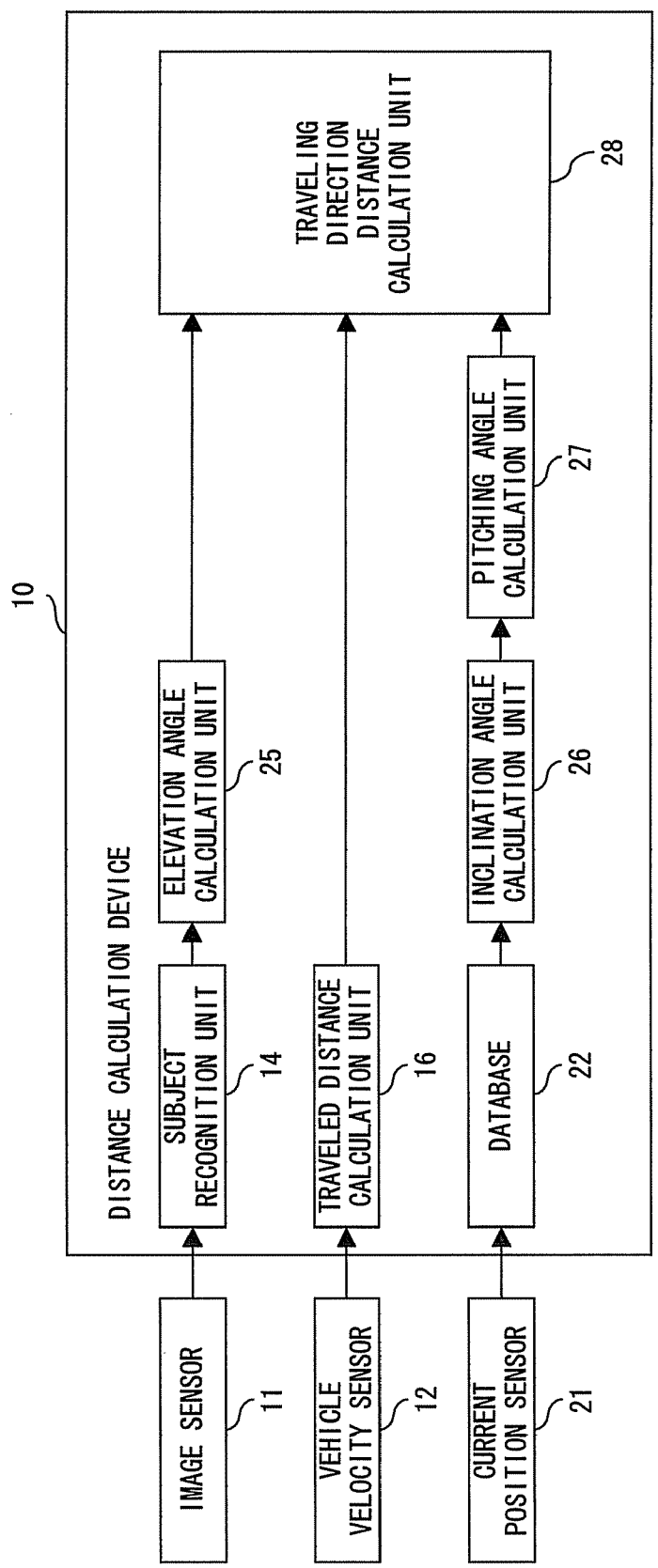
FIG. 12 is a block diagram of the configuration showing the embodiment 3 of the distance calculation device according to the present invention.

The embodiment 3 according to the present invention is explained below by referring to the block diagram shown in FIG. 12. In FIG. 12, as in the embodiment 2 explained by referring to FIG. 9, the distance calculation device 10 comprises, in addition to the subject recognition unit 14 using the output of the image sensor 11, the traveled distance calculation unit 16 using the output of the vehicle velocity sensor 12, and the database 22 using the output of the current position sensor 21, an elevation angle calculation unit 25 for calculating the azimuth angle in the subject direction using the output of the subject recognition unit 14, an inclination angle calculation unit 26 for calculating the inclination angle of the vehicle using the output of the database 22, and a pitching angle calculation unit 27 for calculating the pitching angle of the vehicle using the output of the inclination angle calculation unit 26. A traveling direction distance calculation unit 28 replacing the linear distance calculating unit 18 calculates the component in the traveling direction of the vehicle of the linear distance to the subject using the output of the elevation angle calculation unit 25, the traveled distance calculation unit 16, and the pitching angle calculation unit 27.

The method of calculating the elevation angle by the elevation angle calculation unit 25 is basically the same as the method of calculating an azimuth angle explained by referring to FIG. 5. The elevation angle is calculated using the the coordinates in the x axis direction and the focal length F of the lens in addition to the coordinates in the y axis direction perpendicular to the horizontal plane including the traveling direction of the vehicle on the capture surface shown in FIG. 5. That is, when the x and y coordinates of the traffic signal (signal light) at the point S' is set as x and y in FIG. 5, the value of the elevation angle is obtained by $$\tan^{-1}\left(|yl|/\sqrt{(xl)^2 + F^2}\right)$$

using the dimension 1 in the x and y directions of a pixel.

The inclination angle calculation unit 26 calculates the inclination angle of the peripheral position of the pertinent vehicle based on the difference between the heights above the sea levels between two points whose heights above the sea levels are known around the current position by the database 22 providing the map data of the vicinity of the current position detected by the current position sensor 21, and the calculated inclination angle is provided for the pitching angle calculation unit 27. The details of the inclination angle calculating method are described later.

The pitching angle calculation unit 27 calculates the pitching angle of a vehicle using the inclination angle calculated by the inclination angle calculation unit 26, that is, the inclination angle in the traveling direction on the road, that is, the angle indicating the vertical variance between the axis connecting the front and back of the vehicle and the horizontal line. When the pitching angle of the vehicle changes, the elevation angle changes, and it is impossible to obtain the correct distance to the subject. Therefore, it is necessary to calculate the pitching angle and amend the elevation angle. The elevation angle is amended by the traveling direction distance calculation unit 28 for the elevation angle calculated by the elevation angle calculation unit 25.

The relationship between the pitching angle of a vehicle and the inclination angle of a road depends on the expansion/contraction of the front, rear, left, and right suspensions of a vehicle, and the expansion/contraction of the suspensions depends on the spring coefficient. Therefore, according to the present embodiment, the relationship between the inclination angle and the pitching angle of a vehicle is experimentally obtained. The pitching angle is measured when the vehicle stops on a horizontal plane and when it stops on the slope having the inclination angle of θ. By measuring the pitching angle with the inclination angle θ changed, the relationship between the inclination angle and the pitching angle can be experimentally obtained. When there is no measurement result of the pitching angle for the inclination angle, the pitching angle can be calculated by interpolating the measurement result.

Figure 13:
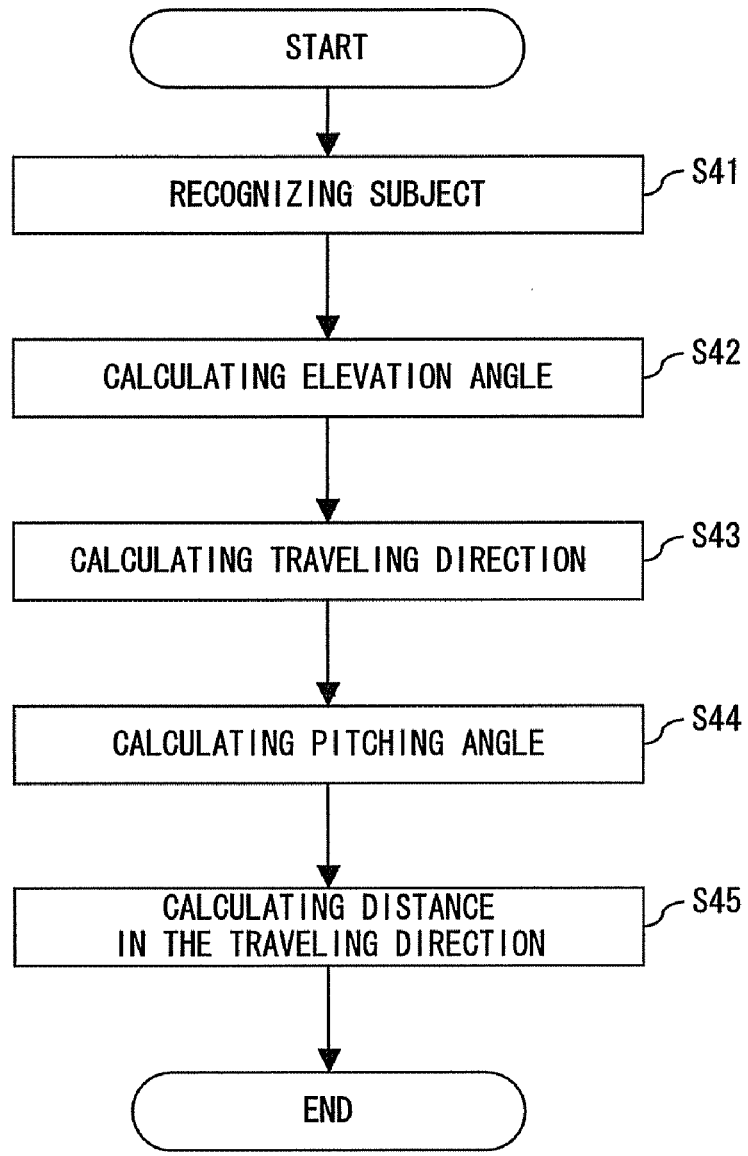
FIG. 13 is a flowchart of the entire traveling direction distance calculating process according to the embodiment 3 of the present invention.

FIG. 13 is the entire flowchart of the traveling direction distance calculating process according to the embodiment 3. In FIG. 13, when the process is started, the subject recognition unit 14 first recognizes the position of the subject as shown in FIG. 4, the elevation angle in the direction of the subject is calculated in step 42, the traveling traveled distance is calculated in step S43, the pitching angle is calculated using the output of the inclination angle calculation unit 26 in step S44, the distance in the traveling direction is calculated as a component parallel to the traveling direction of the vehicle of the vector indicating the distance from the current position of the vehicle to the subject in step S45, thereby terminating the process.

Figure 14:
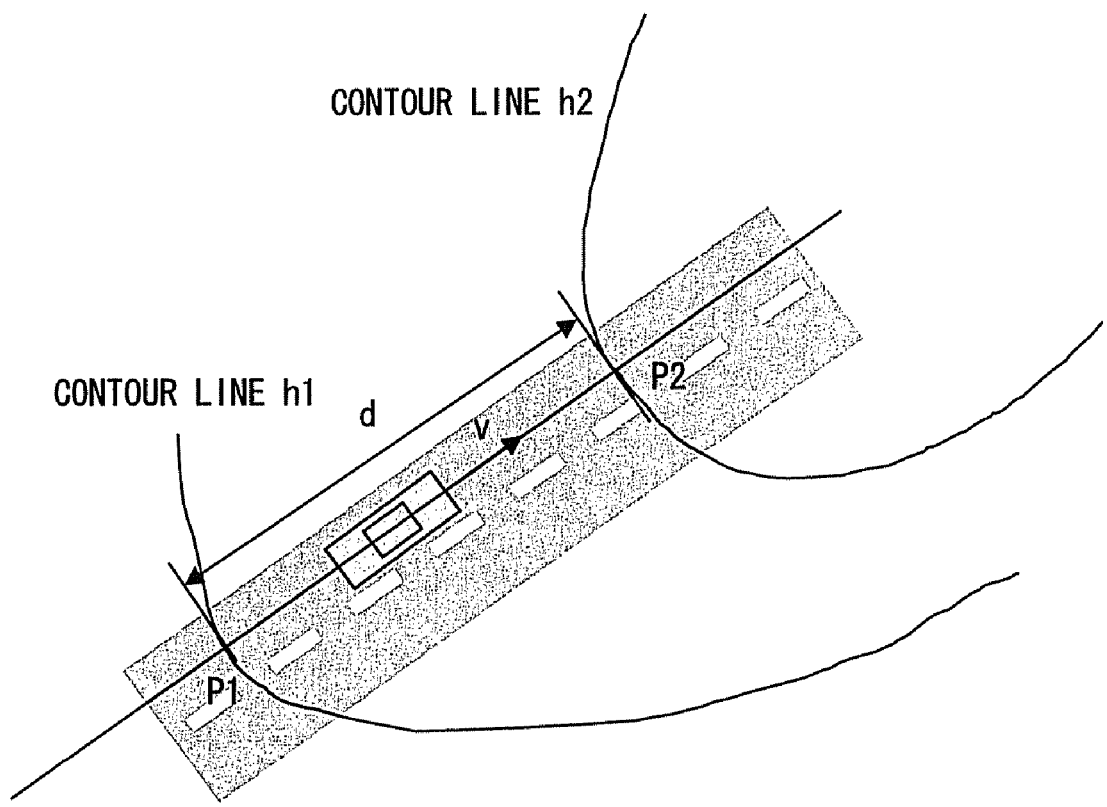
FIG. 14 is an explanatory view of the traveling status of a vehicle for explanation of inclination angle calculation.
Figure 15:
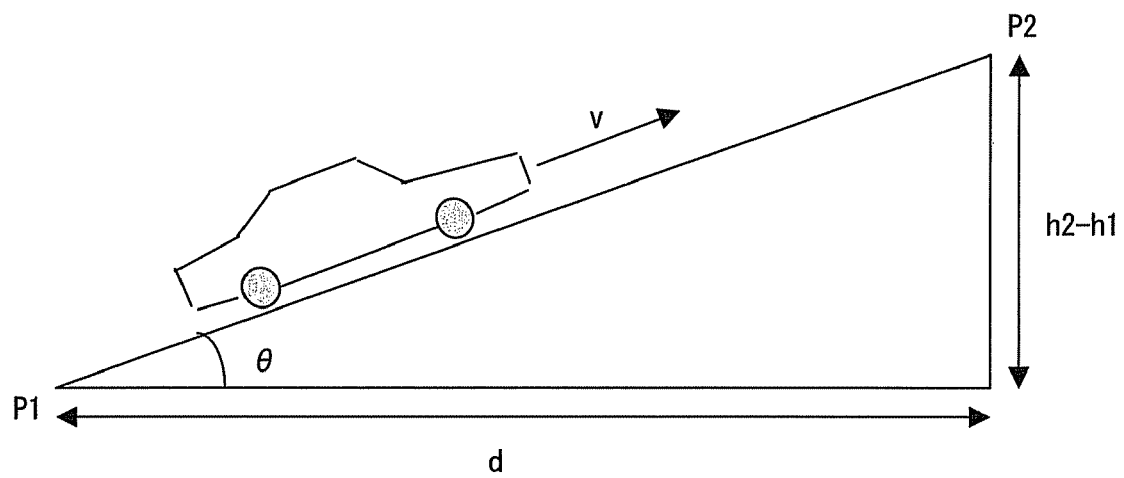
FIG. 15 is an explanatory view of the inclination angle calculating method.
Figure 16:
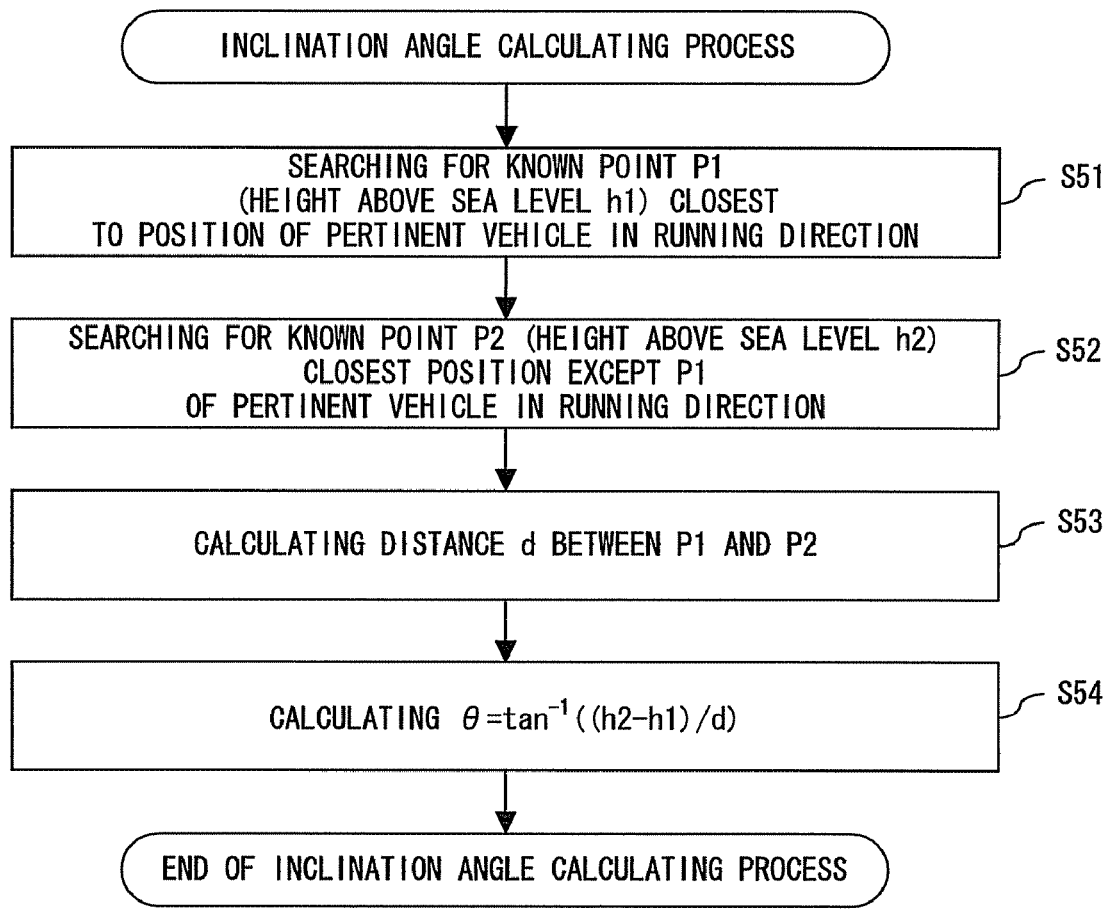
FIG. 16 is a detailed flowchart of the inclination angle calculating process.

The calculation of an inclination angle is explained below. FIGS. 14 and 15 are explanatory views of the method of calculating an inclination angle, and FIG. 16 is a flowchart of the inclination angle calculating process. FIG. 14 is an explanatory view of the running status of a vehicle on the map output from the database 22. It is assumed that there are two points P1 and P2 whose heights above the sea level are known around the current position of the vehicle.

FIG. 15 is an explanatory view of the method of calculating the inclination angle $\theta$. As explained above by referring to FIG. 14, when the difference between the heights above the sea level while the vehicle is running from the point P1 to the point P2 is h2−h1, and the distance between the points P1 and P2 on the map is d, the inclination angle $\theta$ is calculated by the following equation.

$$\theta = \tan^{-1}\{(h2-h1)/d\}$$

When the process is started according to the flowchart of the inclination angle calculating process shown in FIG. 16, the two points P1 and P2 which are closest in distance from the current position of the pertinent vehicle and whose heights above the sea level are known are searched for in steps S51 and S52, the distance d on the map between two points is calculated in step S53, and the inclination angle $\theta$ is calculated in step S54, thereby terminating the process.

Figure 17:
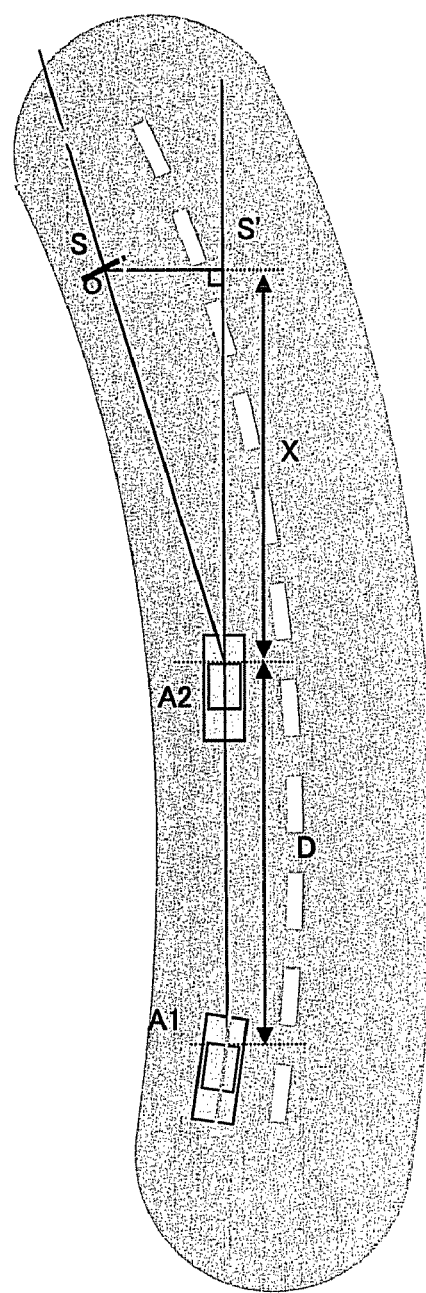
FIG. 17 shows the traveling status of a vehicle for explanation of traveling direction distance calculation.

The calculation of the distance in the traveling direction is explained below by referring to FIGS. 17 through 19. FIG. 17 is an explanatory view of the traveling status of the vehicle. In FIG. 17, the vehicle is assumed to have traveled the distance D from the point A1 to the point A2 in the processing time, for example, 100 ms. In the accumulation, the vehicle is assumed to continue traveling in the linear direction, the line perpendicular to the traveling direction from the position S of the subject crosses the direction at S', and the distance X from the point A2 to S' is the distance in the traveling direction. The vehicle is assumed to approaching the subject S on the curved road actually from the point A2.

Figure 18:
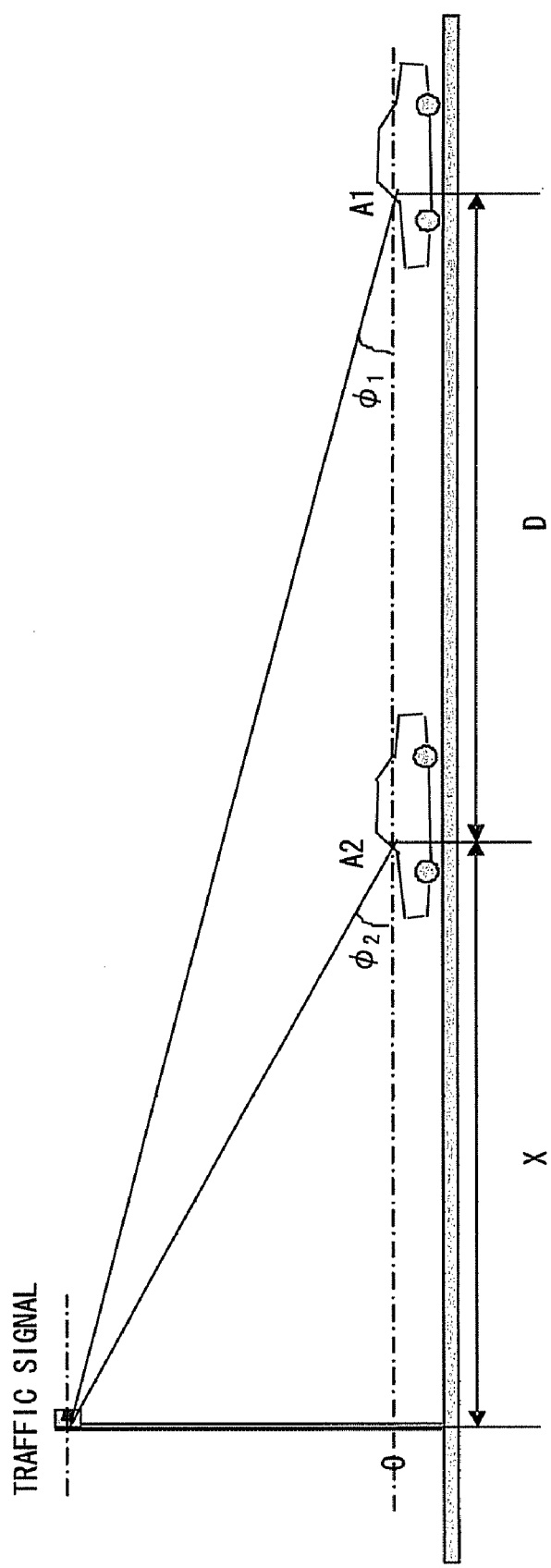
FIG. 18 is an explanatory view of the traveling direction distance calculating method.

FIG. 18 shows the status of the traveling vehicle viewed from its side. As shown in FIG. 18, assume that the vehicle has traveled from the point A1 to the point A2 in the time $\Delta t$. The elevation angle of the traffic signal from the point A2 is $\phi_1$, and the $\phi_2$. Assuming that the traveled distance calculated by the traveled distance calculation unit 16 from the point A1 to the point A2 is D, and the component parallel to the traveling direction of the vehicle of the distance to the traffic signal from the point A2 is X, the following equation holds.

$$(X+D)\tan\phi_1 = X\tan\phi_2$$

X is calculated as follows.

$$X = D\tan\phi_1/(\tan\phi_2 - \tan\phi_1)$$

Thus, the distance to the subject can be calculated. Although the optical axis direction of a camera is indicates an elevation angle $\rho_c$ larger than the traveling direction of the vehicle (set when the camera is mounted), the distance X is calculated by the following equation.

$$X = D\tan(\phi_1+\rho_c)/(\tan(\phi_2+\rho_c)-\tan(\phi_1+\rho_c))$$

Also assume that the pitching angle calculated by the pitching angle calculation unit 27 at the point A1 is $\rho_1$, and the pitching angle calculated by the pitching angle calculation unit 27 at the point A2 is $\rho_2$. At this time, the distance X is expressed by the following equation.

$$X = D\tan(\phi_1+\rho_c+\rho_1)/(\tan(\phi_2+\rho_c+\rho_2)-\tan(\phi_1+\rho_c+\rho_1))$$

Thus, the traveling direction distance calculation unit 28 calculates the component of the distance between the vehicle and the subject parallel to the traveling direction of the vehicle based on the elevation angle calculated by the elevation angle calculation unit 25, the traveled distance calculated by the traveled distance calculation unit 16, and the pitching angle calculated by the pitching angle calculation unit 27.

Figure 19:
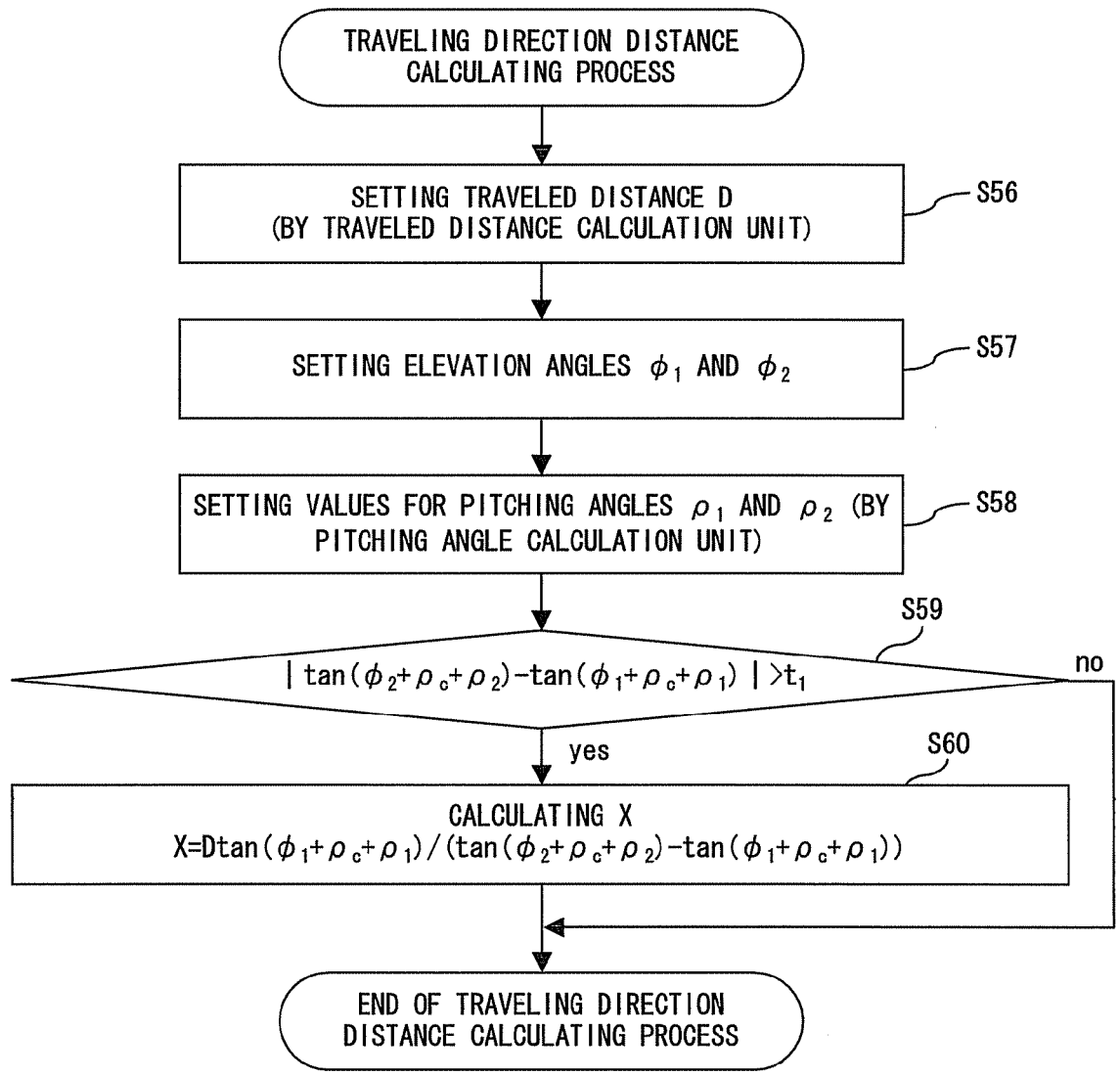
FIG. 19 is a detailed flowchart of the traveling direction distance calculating process.

When the traveling direction distance calculating process shown in FIG. 19 is started, the traveled distance D is set by the traveled distance calculation unit 16 in step S6, two elevation angles are set by the elevation angle calculation unit 25 in step S57, the values of the two pitching angles are set by the pitching angle calculation unit 27 in step S58, and it is determined in step 59 whether or not the absolute value of the denominator of the equation for calculating the value of X is larger than the threshold $t_1$. When it is equal to or smaller than $t_1$, the process immediately terminates. If it is larger than the threshold, the value of X is calculated in step S60, thereby terminating the process. When the absolute value of the denominator of the equation for calculating the X in step S59 is 0 or close to 0, X cannot be correctly calculated. However, if the velocity of the vehicle is extremely low, and the traveled distance D is short, then the traveled distance D is subtracted from the distance X calculated at one point before, and the distance in the traveling direction X can be approximated.

Figure 20:
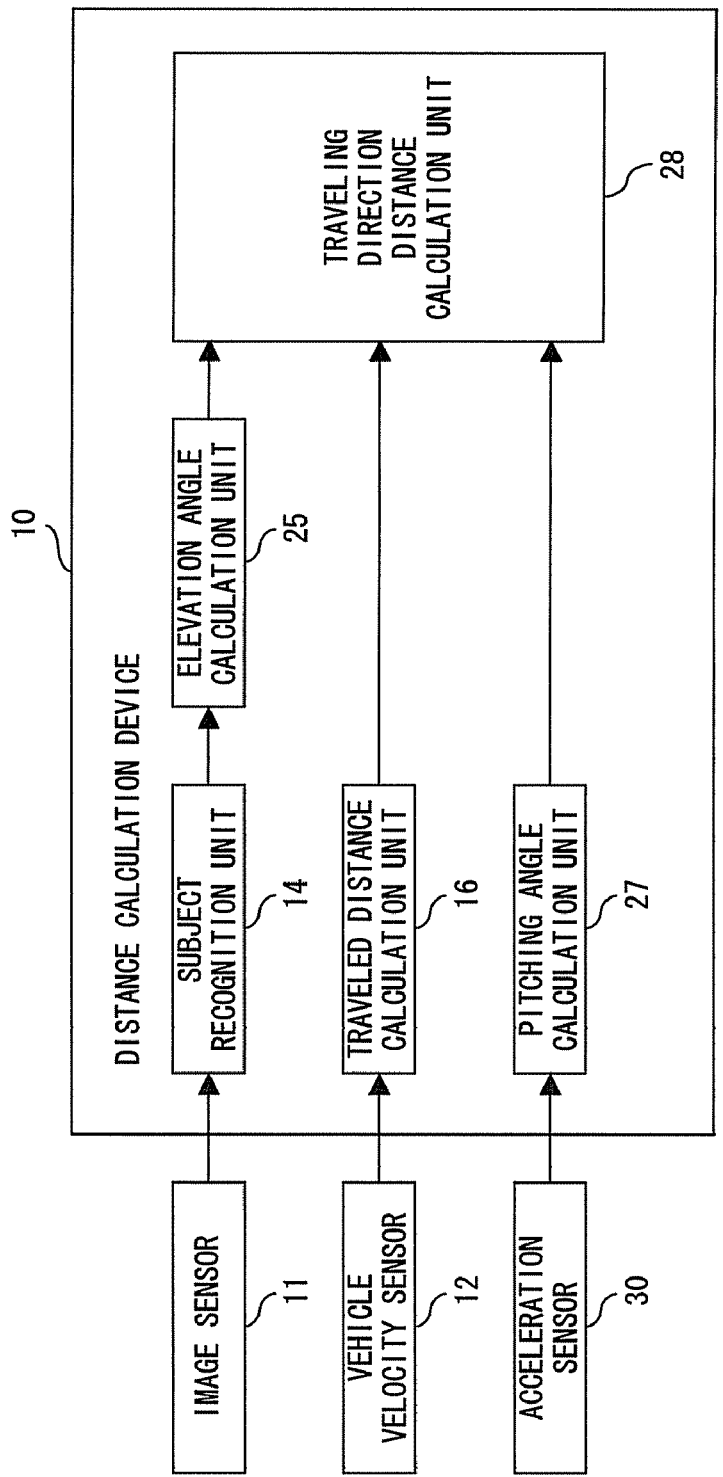
FIG. 20 is a block diagram of the configuration showing the embodiment 4 of the distance calculation device according to the present invention.

Described below is the embodiment 4 of the present invention. FIG. 20 is a block diagram of the configuration of the distance calculation device according to the embodiment 4. As compared with the embodiment 3 shown in FIG. 12, an acceleration sensor 30 for detecting the acceleration in the front-to-rear direction of a vehicle, that is, in the traveling direction of a vehicle, replaces the current position sensor 21 outside the distance calculation device 10, the pitching angle calculation unit 27 calculates the pitching angle using the output of the acceleration sensor, and provides it for the traveling direction distance calculation unit 28. In FIG. 20, the acceleration sensor 30 is mounted in, for example, the central portion of a vehicle, and detects the acceleration component in the front-to-rear direction of a vehicle using a piezoelectric element, etc. The pitching angle calculation unit 27 calculates the pitching angle based on the already-known relationship between the acceleration as the output of the acceleration sensor 30 and the pitching angle of a vehicle.

The relationship between the pitching angle of a vehicle and the acceleration depends on the expansion/contraction of a suspension, that is, the spring coefficient as with the above-mentioned relationship with the inclination angle. Therefore, the relationship between the acceleration and the pitching angle is experimentally obtained.

That is, the pitching angle is measured when a vehicle stops on a horizontal plane and when it travels on a horizontal plane at a constant acceleration. By changing the value of acceleration and measuring the pitching angle, the relationship between the acceleration and the pitching angle can be obtained. When the pitching angle for the value of the acceleration detected by the acceleration sensor 30 has not been measured, a pitching angle can be obtained by interpolating the measurement result.

Figure 21:
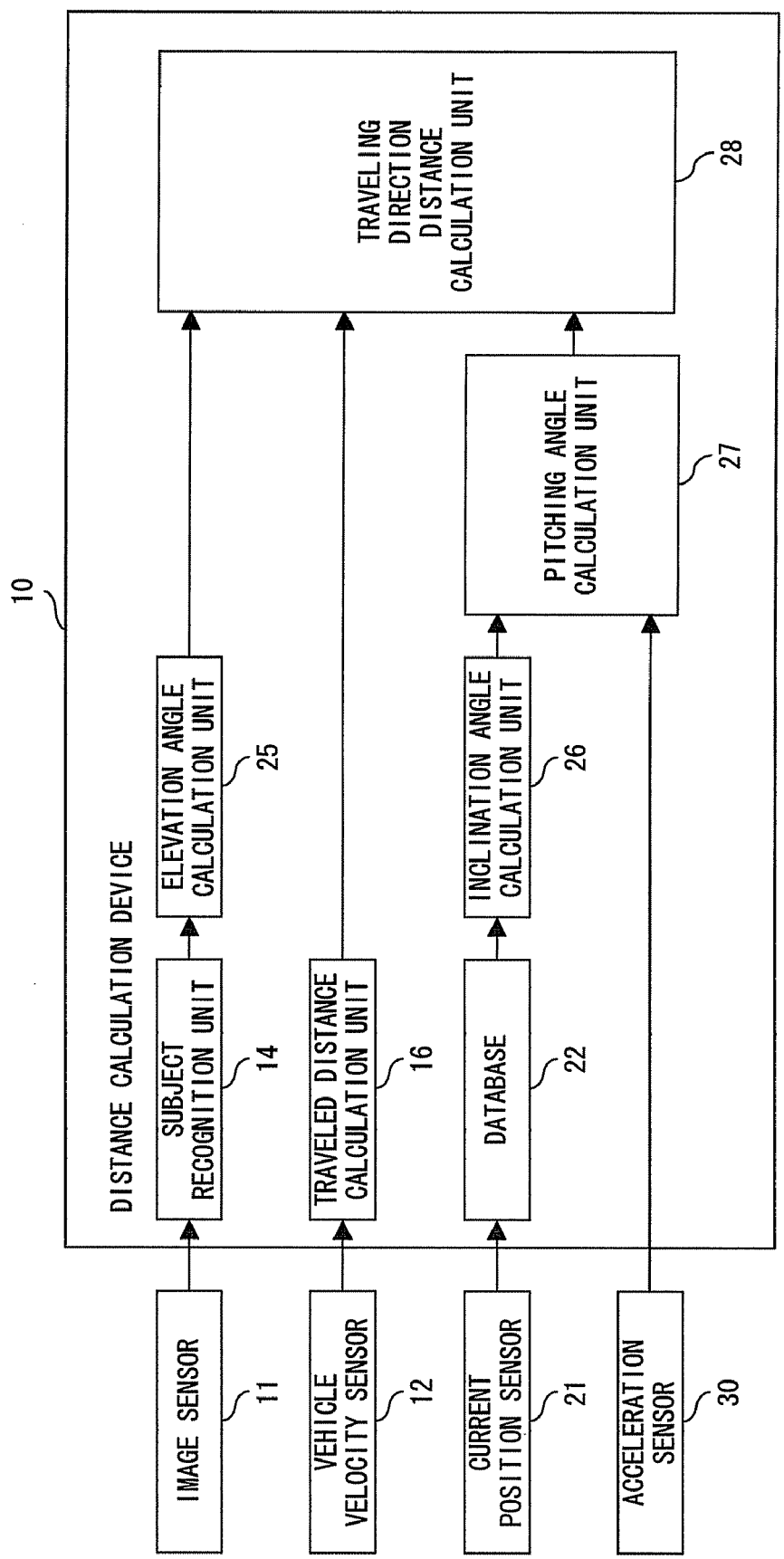
FIG. 21 is a block diagram of the configuration showing the embodiment 5 of the distance calculation device according to the present invention.

Then, the embodiment 5 according to the present invention is explained. FIG. 21 is a block diagram of the configuration according to the embodiment 5 of the distance calculation device. As compared with FIG. 12 showing the embodiment 3 and the FIG. 20 showing the embodiment 4, all components of these embodiments are provided, the pitching angle calculation unit 27 calculates the pitching angle using the output of the acceleration sensor 30 in addition to the output of the inclination angle calculation unit 26, and providing it for the traveling direction distance calculation unit 28.

The pitching angle calculation unit 27 shown in FIG. 21 calculates the pitching angle based on the experimental relationship between the pitching angle and the inclination angle of a road, and the acceleration. The pitching angle when a vehicle is traveling on the slope at a constant inclination angle at a constant velocity is measured, and the measurement with the inclination angle and the acceleration changed is repeated, thereby calculating the pitching angle when an inclination angle and acceleration are provided. Otherwise, using the experimental relationship between the pitching angle and the inclination angle described in the embodiment 3, and the relationship between the pitching angle and the acceleration described in the embodiment 4, each pitching angle is calculated, and the obtained pitching angles are added up, thereby calculating the pitching angle corresponding to the inclination angle and the acceleration.

Figure 22:
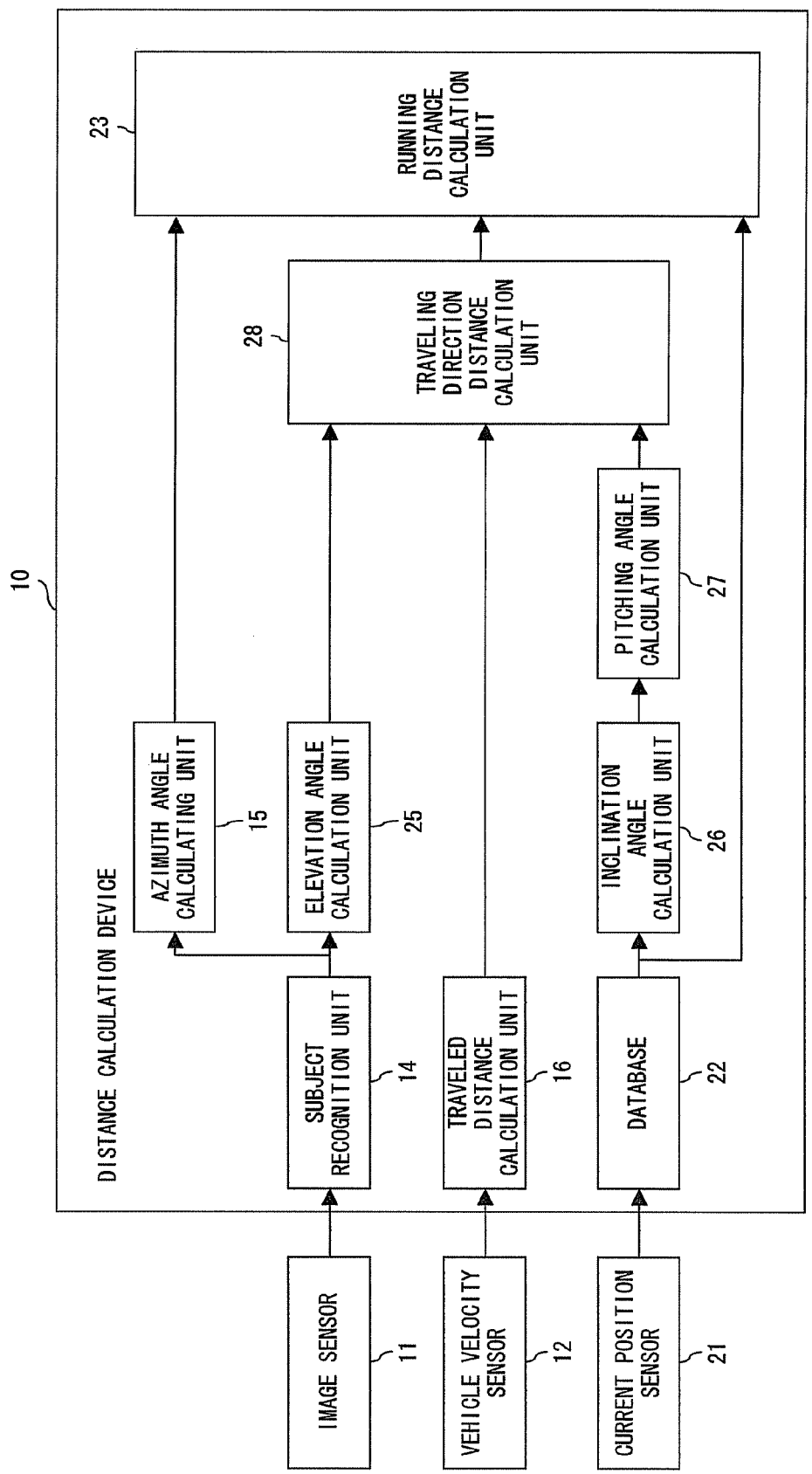
FIG. 22 is a block diagram of the configuration showing the embodiment 6 of the distance calculation device according to the present invention.

FIG. 22 is a block diagram of the configuration of the embodiment 6 of the distance calculation device. As compared with the embodiment 3 shown in FIG. 12, the azimuth angle calculating unit 15 and the running distance calculation unit 23 are further provided. As in the embodiment 1 shown in FIG. 2, the azimuth angle calculating unit 15 calculates the azimuth angle of the vehicle, and provides it for the running distance calculation unit 23.

The running distance calculation unit 23 calculates the running distance using the output of the azimuth angle calculating unit 15, the output of the database 22, and the output of the traveling direction distance calculation unit 28. In the embodiment 2 shown in FIG. 9, the running distance calculation unit 23 calculates the running distance along the road to the subject using the output of the linear distance calculating unit 18, that is, the linear distance from the position of the vehicle to the subject. The process is shown in FIG. 10. The traveling direction distance calculation unit 28 shown in FIG. 22 calculates the distance X in the traveling direction of the vehicle as explained by referring to FIG. 17, and the current position of the vehicle and the linear distance to the subject is easily calculated using the output of the azimuth angle calculating unit 15, that is, $\angle SA_2S'$. Therefore, using the linear distance, the running distance calculation unit 23 can calculate the running distance to the subject.

Figure 23:
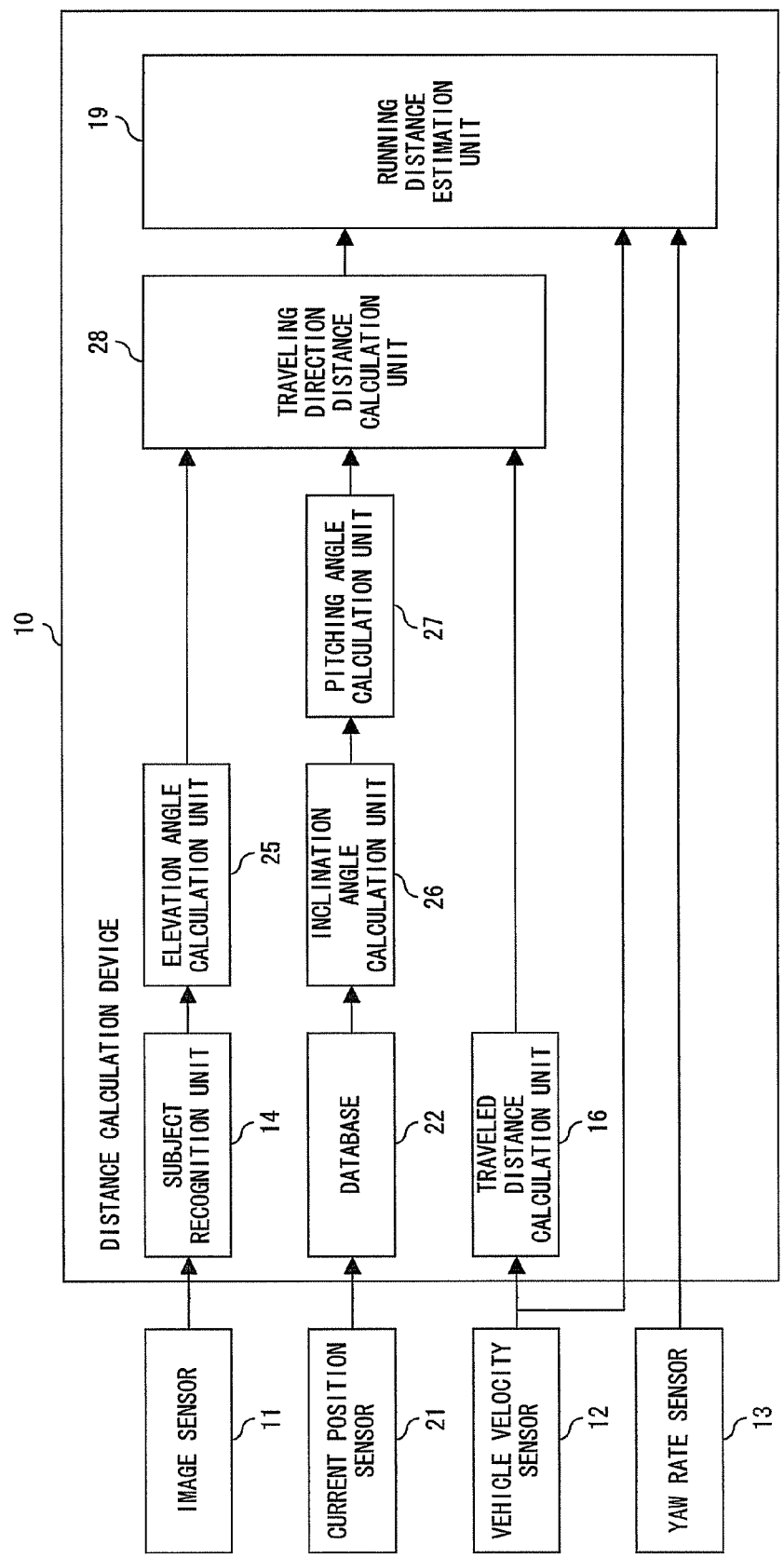
FIG. 23 is a block diagram of the configuration showing the embodiment 7 of the distance calculation device according to the present invention.

FIG. 23 is a block diagram of configuration of the embodiment 7 of the distance calculation device. As compared with the embodiment 3 explained by referring to FIG. 12, the yaw rate sensor 13 explained in the embodiment 1, etc. and the running distance estimation unit 19 are further provided, which are explained in embodiment shown in FIG. 2. The running distance estimation unit 19 estimates the running distance to the subject as in the method explained by referring to FIG. 8 using the calculation result of the linear distance calculating unit 18 in FIG. 2, that is, the calculation result of the traveling direction distance calculation unit 28 replacing the linear distance from the current position of the vehicle to the subject, that is, the difference X explained by referring to FIG. 17.

Figure 24:
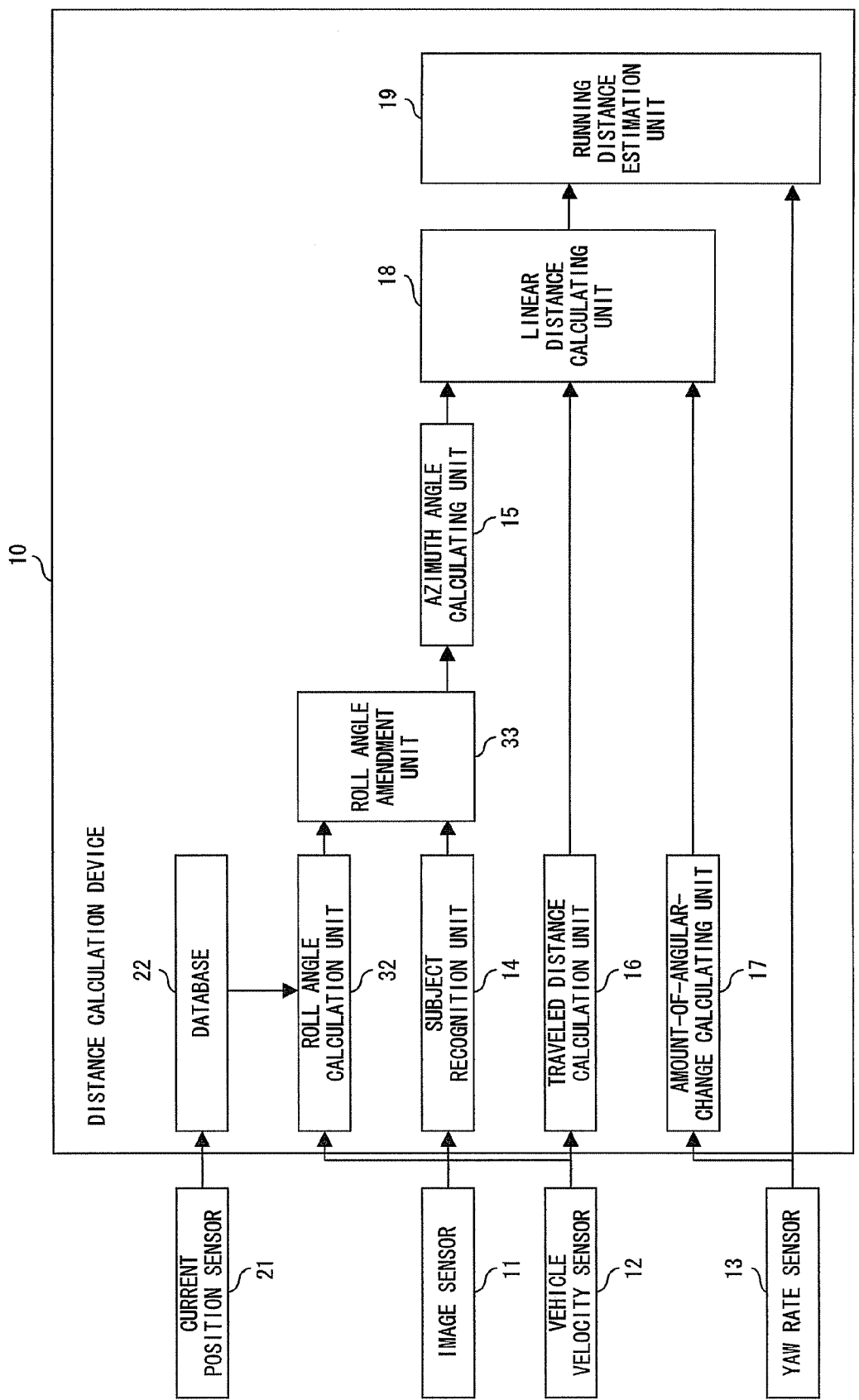
FIG. 24 is a block diagram of the configuration showing the embodiment 8 of the distance calculation device according to the present invention.

FIG. 24 is a block diagram of the configuration of the embodiment 8 of the distance calculation device according to the present invention. As compared with the embodiment 1 shown in FIG. 2, the current position sensor 21 is provided outside the distance calculation device 10, and comprises: the database 22 for receiving the output of the current position sensor 21 in the device 10; a roll angle calculation unit 32 for calculating the angle of roll of a vehicle, that is, the angle of roll as an angle of a vehicle round the axis in the traveling direction, using the output of the database 22 and the output of the vehicle velocity sensor 12; and a roll angle amendment unit 33 which is mounted between the subject recognition unit 14 and the azimuth angle calculating unit 15, amends an error of a recognition result by the subject recognition unit 14 generated by the occurrence of an angle of roll using the output of the subject recognition unit 14 and the output of the roll angle calculation unit 32, and provides the coordinates of the subject as an amendment result for the azimuth angle calculating unit 15.

The roll angle calculation unit 32 shown in FIG. 24 generally calculates an angle of roll generated when a vehicle is traveling a curved road. When the angle of roll is generated, the recognition result by the subject recognition unit 14 is not correct, that is, by the rotation of the optical axis of the image sensor 11, both elevation angle and azimuth angle change, and it is impossible to obtain a correct distance to a subject. Therefore, it is necessary to calculate an angle of roll, correct a recognition result by the subject recognition unit 14, and correctly calculate an azimuth angle.

An angle of roll depends on the radius of curvature of a road on which a vehicle traveling and the expansion/contraction of a suspension. The relationship between the angle of roll and the radius of curvature or a road is experimentally calculated, and the angle of roll obtained when a vehicle travels on a road having a predetermined radius of curvature at a predetermined velocity is measured. By variously changing the radius of curvature and velocity, and measuring the value of an angle of roll, the relationship between the angle of roll and the radius of curvature of the road, and the relationship between the angle of roll and the velocity of a vehicle can be experimentally obtained.

Figure 25:
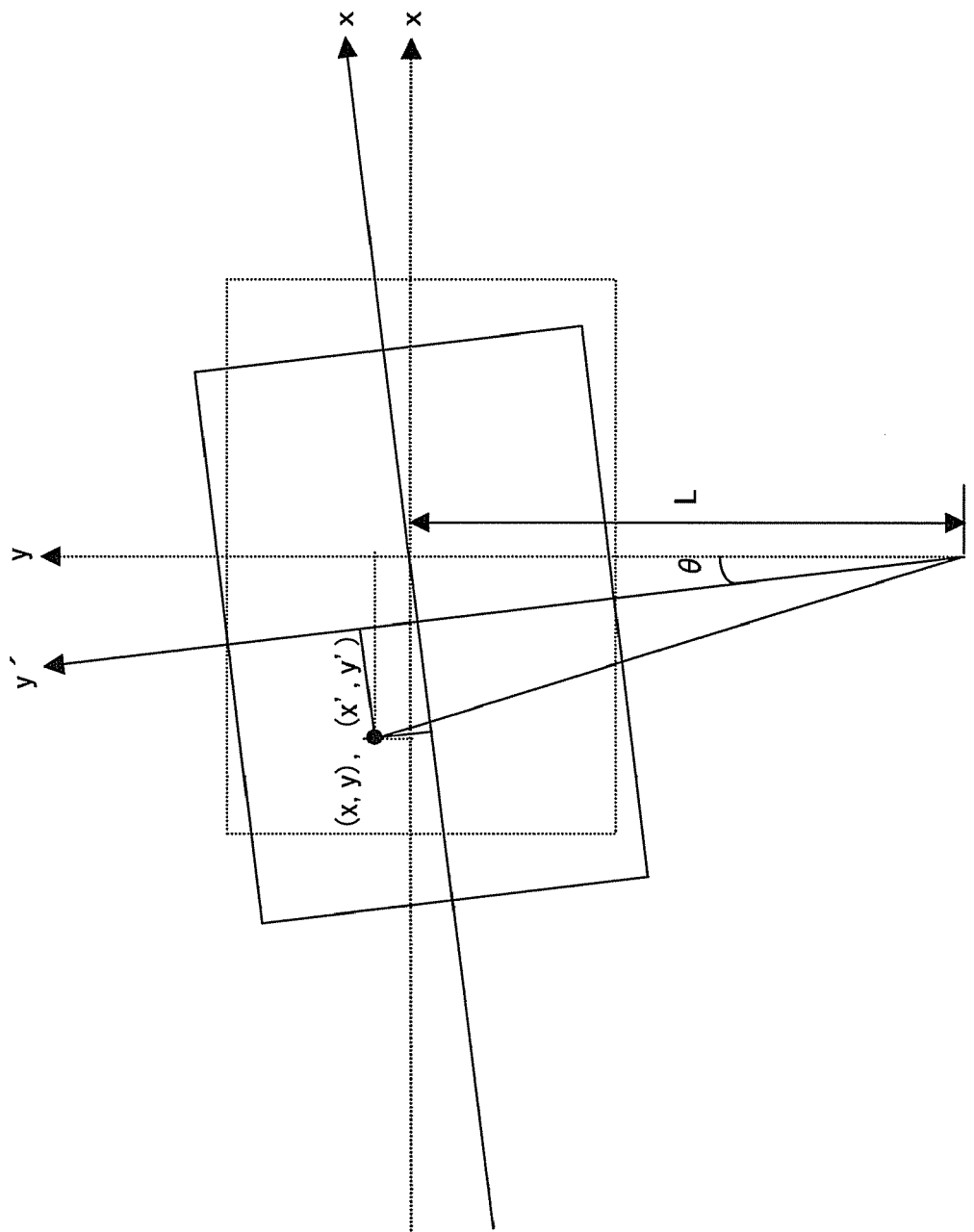
FIG. 25 is an explanatory view of the roll angle amending method.

The roll angle amendment unit 33 amends the recognition result, of the subject recognition unit 14, for example, the coordinates position on the image at the center of signal light of a traffic signal using the angle of roll calculated by the roll angle calculation unit 32. FIG. 25 is an explanatory view of the roll angle amending method. To amend the inclination of the coordinates axis by the angle of roll θ, the coordinates (x, y) are calculated from the coordinates (x', y').

As shown in FIG. 25, assume that the angle of roll is θ, the subject has the coordinates (x', y'), the height of the camera from the centroid of the vehicle to the center of the camera is L, and the pixel size of the camera is 1, and the subject after the amendment has the coordinates (x, y). Using "1", x' and y' are replaced with the distance X' and Y' from the center of the image.

$$X'=x'\cdot 1,\ Y=y'\cdot 1,$$

Based on the relationship between X and Y and the relationship between X' and Y', the following two equations hold.

$$(L+Y)^2+X^2=(L+Y')^2+X'^2$$

$$\tan^{-1}\frac{X}{L+Y}-\theta=\tan^{-1}\frac{X'}{L+Y'}$$

X and Y are calculated by the following equation.

$$X=\tan\theta'\sqrt{\frac{(L+Y')^2+X'^2}{1+\tan^2\theta'}}$$

-continued where $$\theta' = \tan^{-1}\frac{X'}{L+Y'} + \theta$$

$$Y = \sqrt{(L+Y')^2 + X'^2 - X^2} - L$$

Finally, using the pixel size of 1 of the camera, the coordinate system on the image can be restored.

$x=X/1, y=Y/1$

Figure 26:
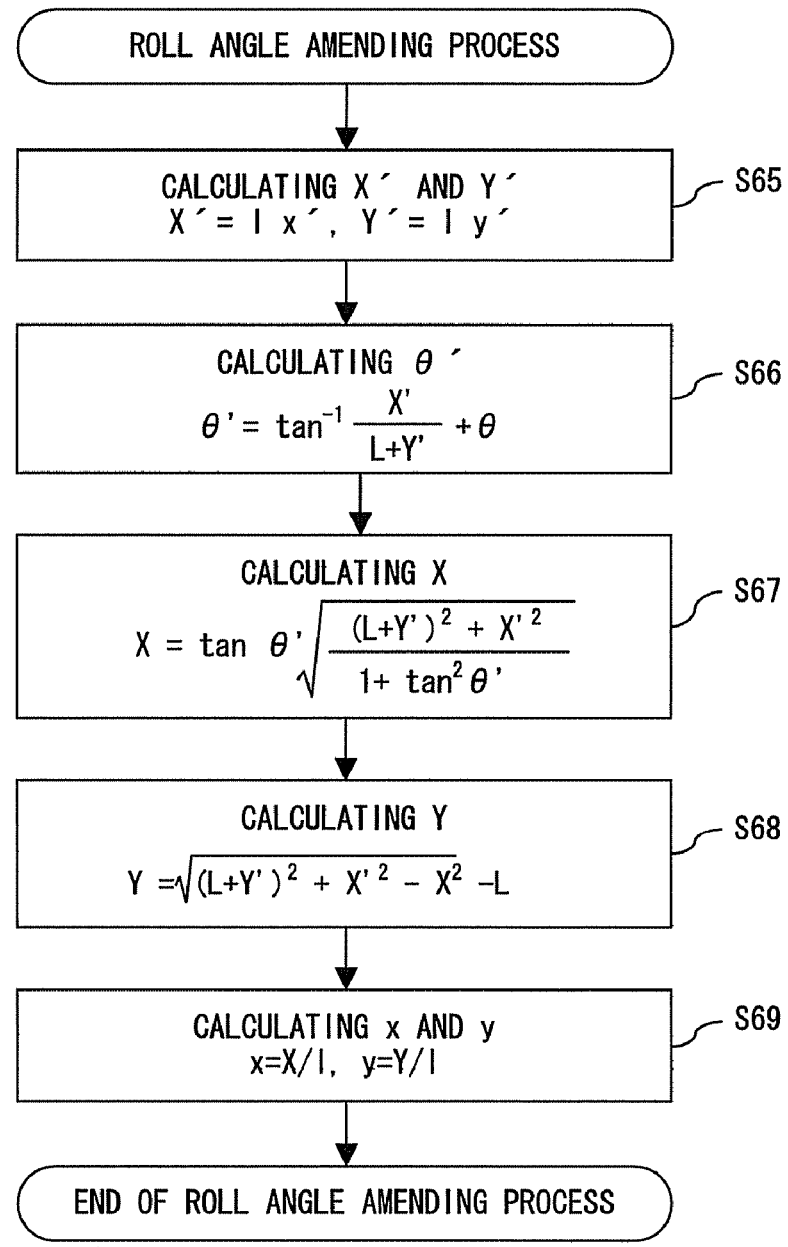
FIG. 26 is a detailed flowchart of the roll angle amending process.

FIG. 26 is a flowchart of the roll angle amending process. In FIG. 26, the distances X' and Y' from the center of the image of the subject are calculated from the coordinates (x', y') of the subject when the angle of roll θ is generated in step S65, the value of θ' is calculated in step S66, the distance X from the center of the amended image of the subject is calculated in step S67, the distance Y is calculated in step S68, and the coordinates (x, y) on the amended image are calculated in step S69, thereby terminating the process.

Figure 27:
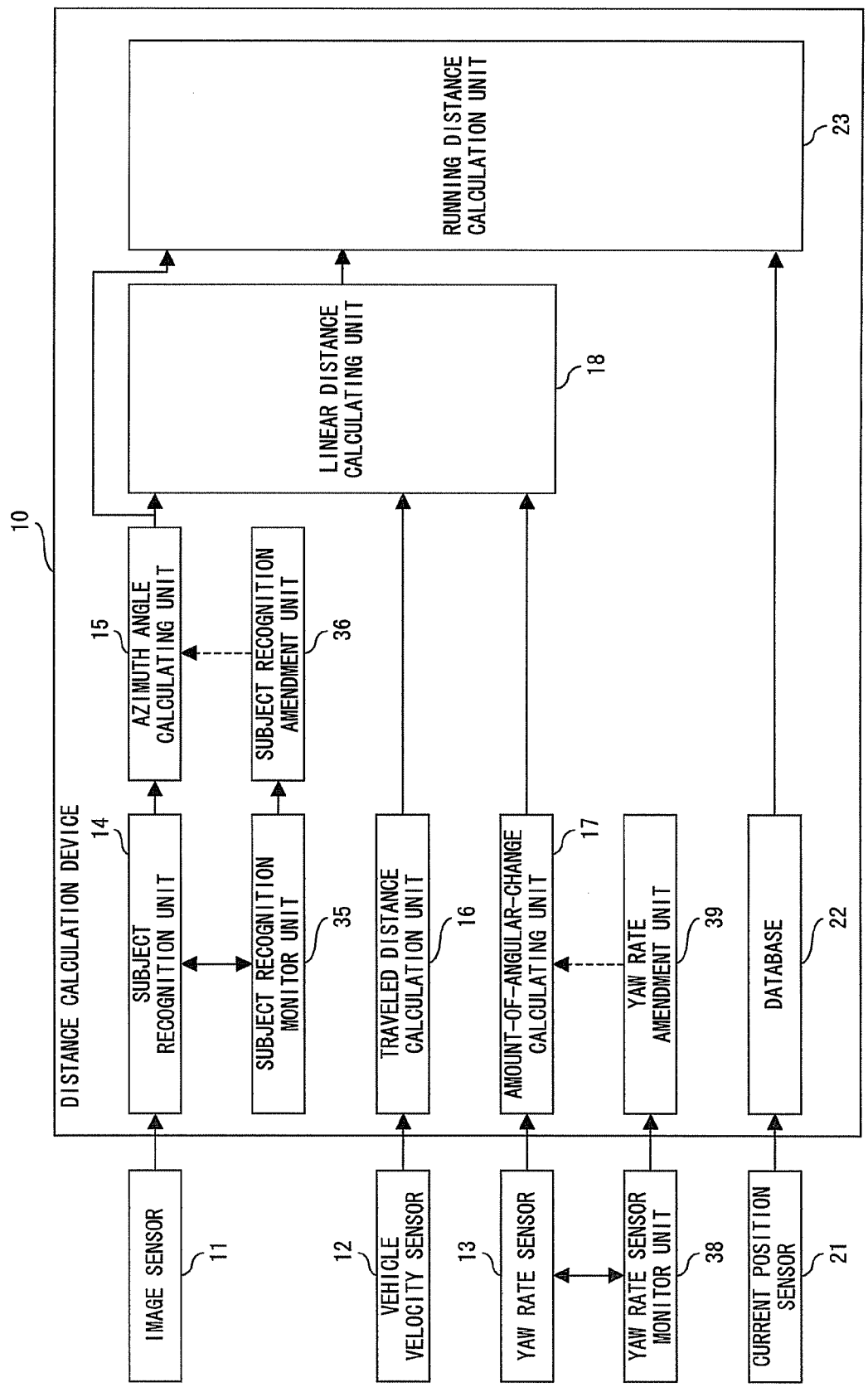
FIG. 27 is a block diagram of the configuration showing the embodiment 9 of the distance calculation device according to the present invention.

Explained below is the final embodiment 9 according to the present invention. FIG. 27 is a block diagram of the configuration of the embodiment 9 of the distance calculation device. As compared with the embodiment 1 shown in FIG. 2, the running distance estimation unit 19 is replaced with the running distance calculation unit 23, the running distance calculation unit 23 is provided with the output of the database 22 based on the output of the azimuth angle calculating unit 15 and the output of the current position sensor 21 in addition to the output of the linear distance calculating unit 18, and the device further comprises: a subject recognition monitor unit 35 for monitoring whether or not the recognition result is not abnormal to the subject recognition unit 14; a subject recognition amendment unit 36 for amending the recognition result of the subject recognition unit 14 when an abnormal condition is detected and providing it for the azimuth angle calculating unit 15, a yaw rate sensor monitor unit 38 for monitoring the output (angular velocity) of the yaw rate sensor 13 or the change rate (angular acceleration) of the output; and a yaw rate amendment unit 39 for amending the output of the yaw rate sensor when the change rate of the output is abnormal, and providing the amendment result for the amount-of-angular-change calculating unit 17.

In FIG. 27, the subject recognition unit 14 recognizes a subject based on the image captured by the image sensor 11, and it is possible that there occurs an error in the recognition result depending on various factors. Therefore, as compared with the past recognition result, for example, when it is determined that there is an abnormal condition in the recognition result of a subject, for example, when the position of a traffic signal as a subject is considerably displaced in the processing interval of 100 ms, etc., the subject recognition monitor unit 35 notifies the subject recognition amendment unit 36 of the abnormal condition.

Upon receipt of the notification that there is an abnormal condition in the recognition result of the subject recognition unit 14, the subject recognition amendment unit 36 provides the azimuth angle calculating unit 15 with a result estimated based on the past recognition result of a subject using a linear estimation and a Kalman filter as an amendment result of recognizing the subject.

The yaw rate sensor monitor unit 38 issues a notification to the yaw rate amendment unit 39 when a doubtful angular velocity change, etc. is detected, for example, when the output of the yaw rate sensor 13, that is, the value of the rotation angular velocity on the vertical axis of a vehicle output by the yaw rate sensor, suddenly changes.

The yaw rate amendment unit 39 provides the corrected value of the yaw rate for the amount-of-angular-change calculating unit 17 using the estimation result by a linear estimation and a Kalman filter based on the past yaw rate and velocity value instead of the output value of the yaw rate sensor when the yaw rate sensor monitor unit 38 notifies the yaw rate amendment unit 39 of an abnormal condition of the output of the yaw rate sensor 13 and its change rate.

In FIG. 27, as compared with, for example, the embodiment shown in FIG. 9, the subject recognition monitor unit 35, the subject recognition amendment unit 36, the yaw rate sensor monitor unit 38, and the yaw rate amendment unit 39 are newly added. It is obvious that, for example, based on the embodiment 7 shown in FIG. 23, each of these units can be added, the recognition result can be amended by the subject recognition amendment unit 36 and then provided for the elevation angle calculation unit 25.

Figure 28:
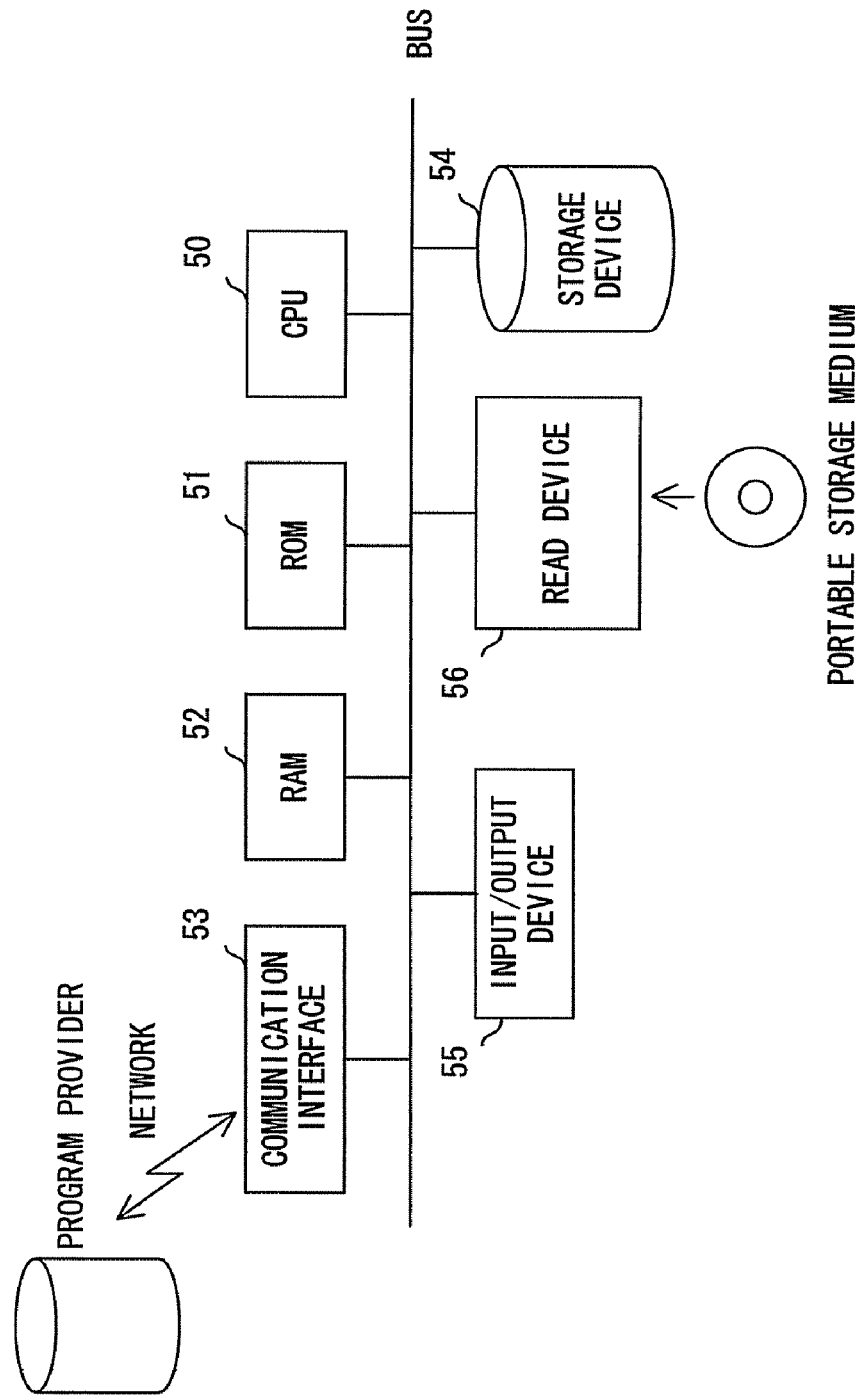
FIG. 28 is an explanatory view of loading a program into a computer according to the present invention.

In the above-mentioned embodiments, the distance calculation device and calculation program according to the present invention are explained, but the distance calculation device can also be configured as a common computer system. FIG. 28 is a block diagram of the configuration of a computer system, that is, a hardware environment.

In FIG. 28, the computer system comprises a central processing unit (CPU) 50, read-only memory (ROM) 51, random access memory (RAM) 52, a communication interface 53, a storage device 54, an input/output device 55, a portable storage medium read device 56, and a bus 57 for connecting all these components.

The storage device 54 can be various types of storage devices such as a hard disk, a magnetic disk, etc. The storage device 54 or the ROM 51 stores a program shown in the flowcharts in FIGS. 3, 4, 7, 11, 13, 16, 19, and 26, a program according to claims 16 through 19 according to the present invention, etc. and the CPU 50 executes the programs to calculate the distance using the image sensor, a vehicle velocity sensor, a current position sensor, an acceleration sensor, a yaw rate sensor, etc.

These programs can be stored in, for example, the storage device 54 from a program provider 58 through a network 59 and the communication interface 53, or stored in a marketed and distributed portable storage medium 60, set in the portable storage medium read device 56, and executed by the CPU 50. The portable storage medium 60 can be various types of storage media such as CD-ROM, a flexible disk, an optical disk, an magneto optical disk, a DVD, etc., and a program stored in such a storage medium can be read by the portable storage medium read device 56 to calculate the correct distance from a running vehicle to a subject according to the embodiments of the present invention.

As explained in detail above, according to the present invention, a subject such as a traffic signal, etc. can be recognized, the azimuth angle or an elevation angle from a pertinent vehicle to a subject can be calculated, influences such as the yaw rate of a vehicle, the acceleration in the traveling direction, the rotation angle on the axis in the traveling direction, the pitching angle by the inclination angle of a road can be amended, thereby correctly calculating the distance from the pertinent vehicle to the subject. Also using the running status of a vehicle and map data, the running distance to a subject can be calculated. Furthermore, when an object of the present invention is to automatically stop a vehicle, a stop line is set as a subject, and the distance to the stop line can be correctly calculated, thereby calculating the distance to various subjects depending on the object of the present invention.

The present invention can be applied not only to the industry of manufacturing a navigation device, but also to all industries requiring the technology of correctly calculating the distance to a subject.

What is claimed is:

1. A distance calculation device which calculates a distance between a movable body and a fixed subject, comprising:
    an azimuth angle calculating unit calculating as an azimuth angle an angle made by a direction connecting the movable body to the subject and a traveling direction of the movable body on a horizontal plane;
    a traveled distance calculation unit calculating a traveled distance between two points of time of the movable body;
    an amount-of-angular-change calculating unit calculating a rotation angle of a movable body on a vertical axis passing through a centroid of a movable body between two points of time as an amount of angular change in a traveling direction; and
    a linear distance calculating unit calculating a linear distance between the movable body and the subject using output of the azimuth angle calculating unit, the traveled distance calculation unit, and the amount-of-angular-change calculating unit.

2. The device according to claim 1, further comprising:
    a current position sensor detecting a current position of the movable body;
    a database unit outputting map information including a road around the current position depending on output of the current position sensor; and
    a running distance calculation unit calculating a distance on a traveling orbit from the current position to the subject using output of the database unit, the azimuth angle calculating unit, and the linear distance calculating unit.

3. The device according to claim 1, further comprising a subject recognition unit recognizing the subject from an image including the subject, and providing a recognition result for the azimuth angle calculating unit.

4. The device according to claim 3, further comprising:
    a subject recognition monitor unit monitoring whether or not output of the subject recognition unit has deviated a predetermined range; and
    a subject recognition amendment unit amending output of the subject recognition unit and providing amended output for the azimuth angle calculating unit when the subject recognition monitor unit detects the deviation.

5. The device according to claim 3, further comprising:
    a current position sensor detecting a current position of the movable body;
    a database unit outputting map information including a road around the current position depending on output of the current position sensor;
    a velocity sensor providing a velocity of the movable body for the traveled distance calculation unit;
    a roll angle calculation unit calculating as an angle of roll a rotation angle on a traveling direction axis of the movable body using output of the database unit and the velocity sensor; and
    a roll angle amendment unit amending coordinates as a recognition result of the subject using output of the roll angle calculation unit and the subject recognition unit, and providing an amendment result for the azimuth angle calculating unit.

6. The device according to claim 1, further comprising:
    a yaw rate sensor detecting a rotation angular velocity on a vertical axis of the movable body, and providing the velocity for the amount-of-angular-change calculating unit; and
    a distance estimation unit estimating a distance on a traveling orbit from the movable body to the subject using the yaw rate sensor and the linear distance calculating unit.

7. The device according to claim 6, further comprising:
    a yaw rate sensor monitor unit monitoring whether or not an output value of the yaw rate sensor and/or a change rate of an output value has deviated a predetermined range of an output value, and/or a range of a change rate of an output value; and
    a yaw rate amendment unit amending an output value of the yaw rate sensor based on past output of the yaw rate sensor and a value of a velocity of the movable body when the yaw rate sensor monitor unit has detected the deviation, and providing an amendment result for the amount-of-angular-change calculating unit.

8. A distance calculation device which calculates a distance between a movable body and a fixed subject, comprising:
    an elevation angle calculation unit calculating as an elevation angle an angle made by a direction connecting the movable body to the subject and a horizontal plane;
    a traveled distance calculation unit calculating a traveled distance between two points of time of the movable body;
    a pitching angle calculation unit calculating as a pitching angle a rotation angle of the movable body on a vertical plane depending on a traveling direction and a vertical direction of the movable body; and
    a traveling direction distance calculation unit calculating a component in a traveling direction of a linear distance from the movable body to the subject using output of the elevation angle calculation unit, the traveled distance calculation unit, and the pitching angle calculation unit.

9. The device according to claim 8, further comprising:
    a current position sensor detecting a current position of the movable body;
    a database unit outputting map information including a road around the current position depending on output of the current position sensor;
    a azimuth angle calculating unit calculating as an azimuth angle an angle made by a direction connecting the movable body and the subject and a traveling direction of the movable body on a horizontal plane; and
    a running distance calculation unit calculating a distance on a traveling orbit from the current position to the subject using output of the database unit, the azimuth angle calculating unit, and the traveling direction distance calculation unit.

10. The device according to claim 8, further comprising a subject recognition unit recognizing a subject from an image containing the subject, and providing the elevation angle calculation unit with the recognition result.

11. The device according to claim 10, further comprising:
    a current position sensor detecting a current position of the movable body;
    a database unit outputting map information including a road around the current position depending on output of the current position sensor;
    a velocity sensor providing a velocity of the movable body for the traveled distance calculation unit;

a roll angle calculation unit calculating as an angle of roll a rotation angle on a traveling direction of the movable body using output of the database unit and the velocity sensor; and a roll angle amendment unit amending coordinates as the recognition result of the subject using output of the roll angle calculation unit and the subject recognition unit, and providing the corrected coordinates for the elevation angle calculation unit.

12. The device according to claim 8, further comprising:

a current position sensor detecting a current position of the movable body;

a database unit outputting map information including a road around the current position depending on output of the current position sensor; and an inclination angle calculation unit calculating an inclination angle in a traveling direction around a current position of the movable body using output of the database unit, wherein the pitching angle calculation unit calculating a pitching angle using output of the inclination angle calculation unit.

13. The device according to claim 12, further comprising an acceleration sensor detecting acceleration in a traveling direction of the movable body, wherein the pitching angle calculation unit calculates a pitching angle using output of the acceleration sensor in addition to output of the inclination angle calculation unit.

14. The device according to claim 8, further comprising an acceleration sensor detecting acceleration in a traveling direction of the movable body, wherein the pitching angle calculation unit calculates a pitching angle using output of the acceleration sensor.

15. A computer-readable storage medium storing a program used to direct a computer which calculates a distance between a movable body and a fixed subject to perform a process, comprising:

calculating as an azimuth angle an angle made by a direction connecting the movable body to the subject and a traveling direction of the movable body on a horizontal plane;

calculating a traveled distance between two points of time of the movable body;

calculating a rotation angle of a movable body on a vertical axis passing through a centroid of a movable body between two points of time as an amount of angular change in a traveling direction;

calculating a linear distance between the movable body and the subject using the calculated azimuth angle, traveled distance, and amount of angular change; and storing the calculated linear distance.

* * * * *